US012223833B1

(12) United States Patent
Patel et al.

(10) Patent No.: US 12,223,833 B1
(45) Date of Patent: Feb. 11, 2025

(54) SYSTEMS AND METHODS FOR INTELLIGENT DIGITAL ALERTING RULES MANAGEMENT

(71) Applicant: HAAS, Inc., Chicago, IL (US)

(72) Inventors: Jigar Patel, Arlington Heights, IL (US); Cory Hohs, Chicago, IL (US)

(73) Assignee: HAAS, Inc., Chicago, IL (US)

( * ) Notice: Subject to any disclaimer, the term of this patent is extended or adjusted under 35 U.S.C. 154(b) by 0 days.

(21) Appl. No.: 18/888,915

(22) Filed: Sep. 18, 2024

(51) Int. Cl.
*G08G 1/0967* (2006.01)
*G07C 5/04* (2006.01)

(52) U.S. Cl.
CPC ......... *G08G 1/096766* (2013.01); *G07C 5/04* (2013.01)

(58) Field of Classification Search
CPC ........... G08G 1/0965; G08G 1/096741; G08G 1/207; G08G 1/096766; B60Q 1/26
See application file for complete search history.

(56) References Cited

U.S. PATENT DOCUMENTS 8,612,131 B2 12/2013 Gutierrez et al.
9,659,496 B2 5/2017 Massey et al.
10,008,111 B1 6/2018 Grant
12,033,506 B1 * 7/2024 Deyaf ...................... B60Q 1/26
2007/0159354 A1 7/2007 Rosenberg
2008/0074286 A1 3/2008 Gill et al.
2009/0174572 A1 7/2009 Smith
2012/0313792 A1 12/2012 Behm et al.
2014/0279707 A1 * 9/2014 Joshua ............... G06Q 30/0283 701/1
2015/0254978 A1 9/2015 Mawbey et al.
2016/0210858 A1 * 7/2016 Foster .................. G08G 1/0965
2018/0268690 A1 9/2018 Gebers
2020/0074853 A1 * 3/2020 Miller .................... G08G 1/012
2023/0124536 A1 4/2023 Chien et al.
2024/0067087 A1 * 2/2024 Tucker .................. B60Q 11/00

* cited by examiner

*Primary Examiner* — Mirza F Alam
(74) *Attorney, Agent, or Firm* — LOZA & LOZA, LLP

(57) ABSTRACT

Systems and methods for use in cloud-based digital vehicle alerting are disclosed. In an example, a computer-implemented method for operating a digital alerting system involves determining a post-alert behavior of a vehicle that was provided a digital alert, the post-alert behavior is determined using 1) a time that the digital alert was provided to the vehicle, and 2) vehicle telemetry data that was received at a digital alerting system from the vehicle, modifying a digital alerting rule based on the post-alert behavior, and updating a rules engine of the digital alerting system with the modified digital alerting rule, wherein the rules engine is configured to implement digital alerting rules.

24 Claims, 13 Drawing Sheets

774

| Vehicle ID | Timestamp | Location Info |
|---|---|---|
| V1 | $t_1$ | |
| V1 | $t_2$ | |
| V1 | $t_3$ | |
| V1 | $t_4$ | |
| V1 | $t_5$ | |
| V1 | $t_6$ | |
| V1 | $t_7$ | |
| V1 | $t_8$ | |
| V1 | $t_9$ | |
| V1 | $t_{10}$ | |
| V1 | $t_{11}$ | |
| | | |

718A Pre-Alert Data

Timestamp Of Digital Alert

718B Post-Alert Data

1228

| Vehicle ID | Timestamp | Location | Alert ID | Alert Timestamp |
|---|---|---|---|---|
| V1 | XX-XX-XXXX_ YY:YY:YY | Lat/Long | - | - |
| V1 | " | " | - | - |
| V1 | " | " | - | - |
| V1 | " | " | XYZ | XX-XX-XXXX_XX:XX:XX |
| V1 | " | " | - | - |
| V1 | " | " | - | - |
| V1 | " | " | - | - |
| V1 | " | " | - | - |
| V1 | " | " | - | - |
| V1 | " | " | - | - |
| V1 | " | " | - | - |
| V1 | " | " | - | - |
| V1 | " | " | - | - |
| V1 | " | " | - | - |
| V1 | " | " | - | - |
| V1 | " | " | - | - |
| V1 | " | " | - | - |
| | | | | |
| | | | | |
| | | | | |

1218A Pre-Alert Data

Digital Alert Received

1218B Post-Alert Data

FIG. 12

SYSTEMS AND METHODS FOR INTELLIGENT DIGITAL ALERTING RULES MANAGEMENT

BACKGROUND

Digital alerting is being used to improve roadway safety. Cloud based safety systems are being used to track in real time the overlap of alerting zones and vehicles that may benefit from an alerting of a possible roadway hazard. Such cloud based safety systems typically provide digital alerts according to digital alerting rules and in large-scale deployments with many different types of hazards and many different types of digital alerting rules, it can be difficult to know if the digital alerting rules are in fact improving safety on the roadways.

SUMMARY

Systems and methods for use in cloud-based digital vehicle alerting are disclosed. In an example, a computer-implemented method for operating a digital alerting system involves determining a post-alert behavior of a vehicle that was provided a digital alert, the post-alert behavior is determined using 1) a time that the digital alert was provided to the vehicle, and 2) vehicle telemetry data that was received at a digital alerting system from the vehicle, modifying a digital alerting rule based on the post-alert behavior, and updating a rules engine of the digital alerting system with the modified digital alerting rule, wherein the rules engine is configured to implement digital alerting rules.

In an example, determining a post-alert behavior includes 1) identifying, in an alert database of the digital alerting system, a timestamp of the digital alert and a vehicle ID of the vehicle that received the digital alert, 2) identifying, in a vehicle tracking database of the digital alerting system, vehicle telemetry data for the vehicle that is later in time than the time that the digital alert was provided to the vehicle, wherein the vehicle telemetry data for the vehicle that is later in time than the time that the digital alert was provided to the vehicle is identified in the vehicle tracking database using the timestamp of the digital alert and the vehicle ID, and 3) using the vehicle telemetry data for the vehicle that is later in time than the time that the digital alert was provided to the vehicle to determine the post-alert behavior.

In an example, determining a post-alert behavior includes 1) identifying, in an alert database of the digital alerting system, a vehicle ID of the vehicle that received the digital alert, wherein the alert database includes alert entries, with each alert entry including an alert ID, a timestamp, and vehicle IDs of alerted vehicles, 2) identifying, in a vehicle tracking database of the digital alerting system, vehicle telemetry data for the vehicle that is later in time than the time that the digital alert was provided to the vehicle, wherein the vehicle tracking database includes vehicle data entries, with each vehicle data entry including a vehicle ID, a timestamp, and location information, wherein the vehicle telemetry data for the vehicle that is later in time than the time that the digital alert was provided to the vehicle is identified in the vehicle tracking database using the vehicle ID, timestamps of the vehicle data entries, and a timestamp of the digital alert, and 3) using the vehicle telemetry data for the vehicle that has a timestamp later in time than the timestamp of the digital alert to determine the post-alert behavior.

In an example, the post-alert behavior of the vehicle is determined using vehicle telemetry data that is later in time than the time that the digital alert was provided to the vehicle.

In an example, the post-alert behavior includes a time interval between the time that the digital alert was provided to the vehicle and a time that the vehicle encountered a hazard that corresponds to the digital alert.

In an example, the post-alert behavior includes deceleration of the vehicle.

In an example, the post-alert behavior includes a change in direction of the vehicle.

In an example, determining a post-alert behavior includes 1) identifying a vehicle ID of the vehicle that received the digital alert, 2) identifying, using the vehicle ID, vehicle telemetry data for the vehicle that is later in time than the time that the digital alert was provided to the vehicle, and 3) using the vehicle telemetry data for the vehicle that is later in time than the time that the digital alert as provided to the vehicle to determine the post-alert behavior.

In an example, modifying the digital alerting rule based on the post-alert behavior includes comparing the post-alert behavior to a safety principle.

In an example, the safety principle is an alert time buffer, which is a target time interval between the time that the digital alert was provided to the vehicle and a time that the vehicle encountered a hazard corresponding to the digital alert.

In an example, the safety principle is a deceleration threshold.

In an example, the safety principle is a change in direction threshold.

In an example, the post-alert behavior of the vehicle is determined using vehicle telemetry data that is later in time than the time that the digital alert was provided to the vehicle, and modifying the digital alerting rule based on the post-alert behavior includes comparing the post-alert behavior to a safety principle.

In an example, the safety principle is a time interval between the time that the digital alert was provided to the vehicle and a time that the vehicle encountered a hazard that corresponds to the digital alert, and wherein modifying the digital alerting rule includes changing a dimension of an alerting zone when the time interval is not met.

In an example, the post-alert behavior includes deceleration of the vehicle and the safety principle is a deceleration threshold.

In an example, modifying the digital alerting rule includes increasing a dimension of an alerting zone when the deceleration exceeds the deceleration threshold.

In an example, the post-alert behavior includes a change in direction of the vehicle and the safety principle is a change in direction threshold.

In an example, modifying the digital alerting rule includes increasing a dimension of an alerting zone when the change in direction of the vehicle exceeds the change in direction threshold.

In an example, modifying the digital alerting rule includes changing a frequency of digital alerting to a vehicle.

In an example, modifying the digital alerting rule includes changing a characteristic of how a digital alert is presented within a vehicle.

In an example, the method further includes generating a new digital alert in response to application of the modified digital alerting rule.

In an example, the digital alerting rule is modified in view of the post-alert behavior and in view of pre-alert behavior.

In an example, the method further includes determining the pre-alert behavior using the time that the digital alert was provided to the vehicle, and vehicle telemetry data that was received at a digital alerting system from the vehicle.

In an example, the method further includes 1) receiving telemetry data that includes a location of an alerting vehicle and an alert status of the alerting vehicle, 2) receiving telemetry data that includes locations and vehicle IDs corresponding to a plurality of non-alerting vehicles, and 3) generating digital alerts for the non-alerting vehicles that are in an alerting zone of the alerting vehicle using the telemetry data.

Also disclosed, is a non-transitory computer readable medium comprising instructions to be executed in a computer system, the instructions when executed in the computer system perform a method involving determining a post-alert behavior of a vehicle that was provided a digital alert, wherein the post-alert behavior is determined using 1) a time that the digital alert was provided to the vehicle, and 2) vehicle telemetry data that was received at a digital alerting system from the vehicle, modifying a digital alerting rule based on the post-alert behavior, and updating a rules engine of the digital alerting system with the modified digital alerting rule, wherein the rules engine is configured to implement digital alerting rules.

Other aspects in accordance with the invention will become apparent from the following detailed description, taken in conjunction with the accompanying drawings, illustrated by way of example of the principles of the invention.

BRIEF DESCRIPTION OF THE DRAWINGS

FIG. 12 is an example of vehicle telemetry data that is collected at the safety cloud.

Throughout the description, similar reference numbers may be used to identify similar elements.

DETAILED DESCRIPTION

Figure 1:
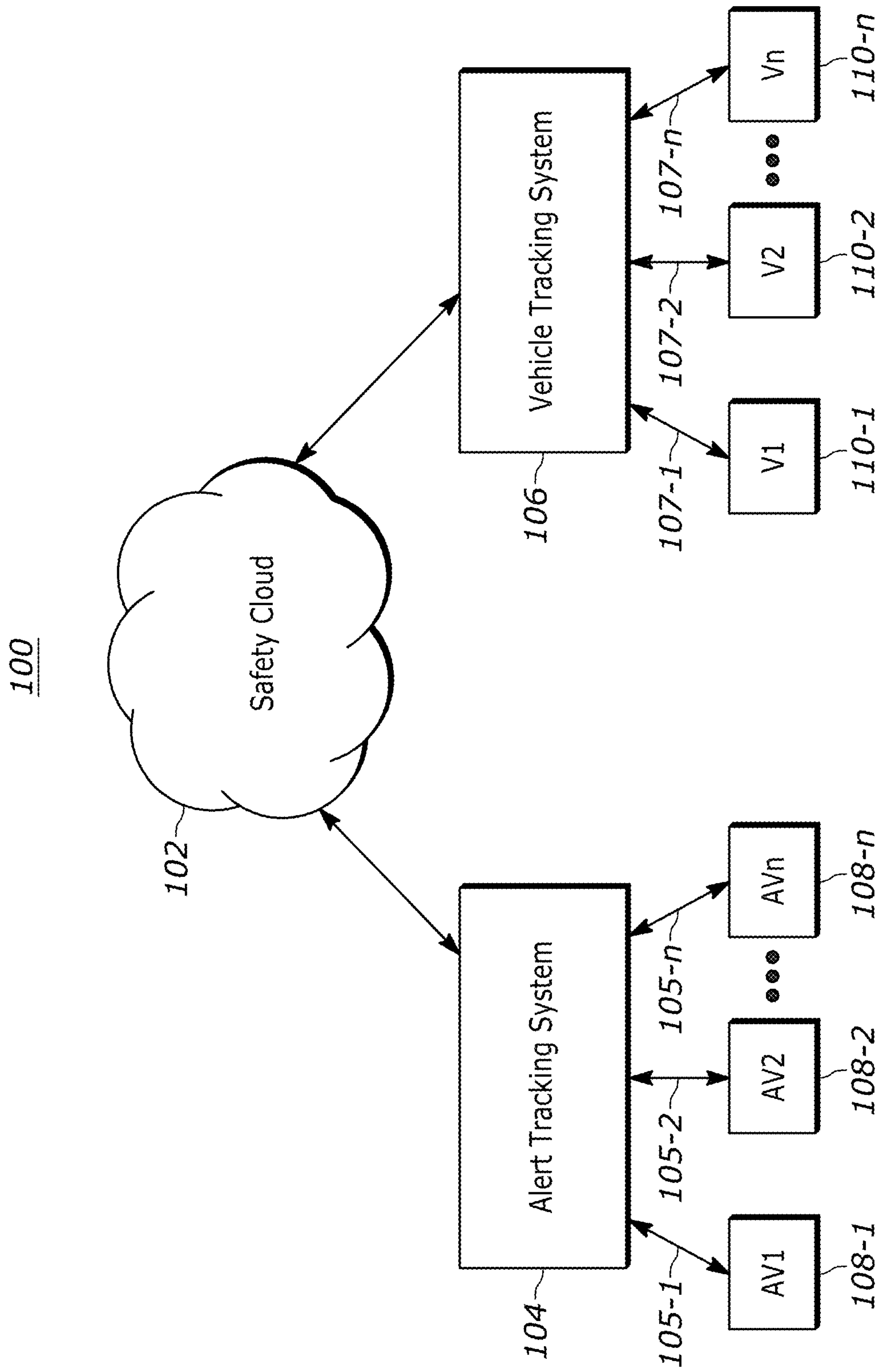
FIG. 1 is a high-level overview of a safety system for vehicle alerting.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

An "alerting zone" may be characterized as a geographical area near an alerting vehicle, near a route of the alerting vehicle, near a safety hazard (e.g., a construction zone, a car accident, a vehicle stopped along the side of the road, a lane closure, a road closure, etc.), or any combination thereof. Examples of an alerting zone may include, but are not limited to, a geographical area that covers a projected path of an alerting vehicle (plus X miles along each side of the path), a geographical area that surrounds an alerting vehicle (by X miles or X feet) and that changes as the alerting vehicle changes locations (e.g., travels along a projected path), or a geographical area that is within an X (X represents a positive value) mile or feet radius of a safety hazard. In some examples, the geographical area of an alerting zone is defined by a set of geographical coordinates that are within a predetermined range of a particular location. In some embodiments, the geographical area may resemble a circle, an oval, a rectangle, a line, or other shape. In an embodiment, an alerting zone is determined by/in a safety cloud of a safety system. An example of a safety system is described in further detail with reference to FIG. 1.

FIG. 1 is a high-level overview of a safety system 100. The safety system 100 includes a safety cloud 102 that is connected to an alert tracking system 104 and to a vehicle tracking system 106. The safety cloud 102 may be implemented via software running on a computing system such as a remote server, a public cloud (e.g., AMAZON® Web Services (AWS), GOOGLE® Cloud, MICROSOFT® Azure, etc.), and/or a private cloud. In an embodiment, the safety cloud is implemented via a cloud computing system. The alert tracking system 104 and/or the vehicle tracking system 106 may be implemented via third-party computing systems, including for example, software running on a computing system such as a remote server, a public cloud, and/or a private cloud.

The alert tracking system 104 connects to one or more alerting vehicles (AVs), implemented as alerting vehicles AV1 108-1, AV2 108-2, and AVn **108-*n* (where n represents an integer of one or more), via, for example, a wireless service provider network (e.g., 3G, 4G, 5G, etc.). Alerting vehicles AV1 108-1, AV2 108-2, and AVn 108-*n* connect to the alert tracking system 104 over wireless connections via a first connection 105-1, a second connection 105-2, and an nth connection 105-*n*, respectively. Examples of the alerting vehicles include emergency vehicles (e.g., a police car, an ambulance, a firetruck, a military vehicle, or the like), safety vehicles (e.g., a construction vehicle, a towing vehicle, or the like), and/or other vehicles/devices that are capable of sending alerting vehicle data and/or connecting to the alert tracking system 104 over a wireless connection via a wireless service provider network. The alerting vehicles AVs 108-1, 108-2, and 108-*n* may be included in an emergency vehicle fleet (e.g., a fleet of police cars corresponding to a police department, a fleet of firetrucks corresponding to a fire department, etc.). In an embodiment, the AVs 108-1, 108-2, and 108-*n* are equipped with radios (e.g., a fixed radio and/or a mobile radio) to implement a wireless connection with a wireless service provider network. Although an alerting vehicle may commonly be a vehicle, the alerting vehicle may alternatively be an object with a radio that is capable of sending telemetry data and/or of connecting to the alert tracking system 104**.

In an embodiment, alerting vehicles AV1 108-1, AV2 108-2, and AVn **108-*n* transmit alerting vehicle telemetry data to the alert tracking system 104. As an example, the alerting vehicle telemetry data may include a vehicle ID that corresponds to the vehicle (e.g., AV1 308-1, AV2 308-2, or AVn 308-*n***), location information (e.g., longitude and latitude coordinates) that corresponds to the location of the vehicle, a speed, acceleration, trajectory, direction, and/or azimuth of the vehicle, and an alert ID that indicates whether emergency lights of an alerting vehicle are on/off. In an example, the alerting vehicles transmit alerting vehicle telemetry data to the alert tracking system on regular intervals, such as 2 second intervals. In some examples, the interval may be different depending on the state of the alerting vehicle, for example, in a range of 1-20 second intervals. For example, an alerting vehicle may transmit vehicle telemetry data at shorter time intervals while the vehicle is in an alerting state (e.g., while its emergency lights are on).

The vehicle tracking system 106 connects to one or more vehicles (V), implemented as vehicles V1 110-1, V2 110-2, and Vn **110-*n* (n represents an integer greater than one), via a wireless service provider wireless network. Vehicles V1 110-1, V2 110-2, and Vn 110-*n* connect to the vehicle tracking system over wireless connections via a first connection 107-1, a second connection 107-2, and an nth connection 107-*n*, respectively. As described herein, a "vehicle" may refer to a civilian vehicles, a consumer vehicle, or more generally to a vehicle that is not configured as an alerting vehicle. For example, the vehicles V1 110-1, V2 110-2, and Vn 110-*n* are considered as "non-alerting" vehicles because the vehicles are not connected to the alert tracking system 104, the vehicles do not have emergency lights or a siren, and/or the vehicles are not configured to transmit an alert signal that indicates, for example, whether or not emergency lights and/or siren are on. The vehicles V1 110-1, V2 110-2, and Vn 110-*n* may be included in a vehicle fleet (e.g., a fleet of cars owned by a company). In an embodiment, the vehicles V1 110-1, V2 110-2, and Vn 110-*n* are equipped with radios (e.g., a fixed radio and/or a mobile radio) to implement a wireless connection to a wireless service provider network. In an embodiment, vehicles V1 110-1, V2 110-2, and Vn 110-*n* periodically send vehicle telemetry data to the vehicle tracking system 106 via the wireless service provider network. In an example, the vehicles transmit vehicle telemetry data to the vehicle tracking system on regular intervals, such as 2 second intervals. In some examples, the interval may be different depending on different factors, for example in a range of 1-20 second intervals. For example, a vehicle may transmit vehicle telemetry data at shorter time intervals while the vehicle is in an alerting zone. In an example, the vehicle telemetry data may include a vehicle ID that corresponds to the vehicle (e.g., V1 110-1, V2 110-2, or Vn 110-*n*), location information (e.g., longitude and latitude coordinates) that corresponds to the location of the vehicle, a speed, acceleration, trajectory, direction, and/or azimuth of the vehicle although the vehicle telemetry data may include other types of information. Although vehicles V1 110-1, V2 110-2, and Vn 110-*n* may commonly be vehicles, the vehicles V1, V2, and/or Vn may also be an object such as a radio, a smartphone, or other similar device capable of sending telemetry data and/or of connecting to the vehicle tracking system 106**.

In some embodiments, the safety cloud 102 receives alerting vehicle telemetry data from alerting vehicles AV1 108-1, AV2 108-2, and/or AVn **108-*n* via the alert tracking system 104, and receives vehicle telemetry data from vehicles V1 110-1, V2 110-2, and/or Vn 110-*n* via the vehicle tracking system 106. The safety cloud 102 may use the alerting vehicle telemetry data to determine an alerting zone that is associated with an alerting vehicle. The safety cloud 102** may use the vehicle telemetry data to determine whether any non-alerting vehicles are located in the alerting zone, and to determine whether or not to provide a digital alert to vehicles that are located in the alert zone, where the digital alert may indicate that there is a potential hazard nearby.

Cloud based safety systems, similar to the system described with reference to FIG. 1, may establish an alerting zone relative to an alerting vehicle and then send digital alerts to non-alerting vehicles that are located within the alerting zone. A conventional way of establishing an alerting zone involves identifying a geographical area that covers a projected path of an alerting vehicle and/or a geographical area that surrounds the alerting vehicle.

Examples of how a cloud-based safety system can be used to alert vehicles of potential hazards is described with reference to FIGS. 2A, 2B, and 3A-3E.

Figure 2A:
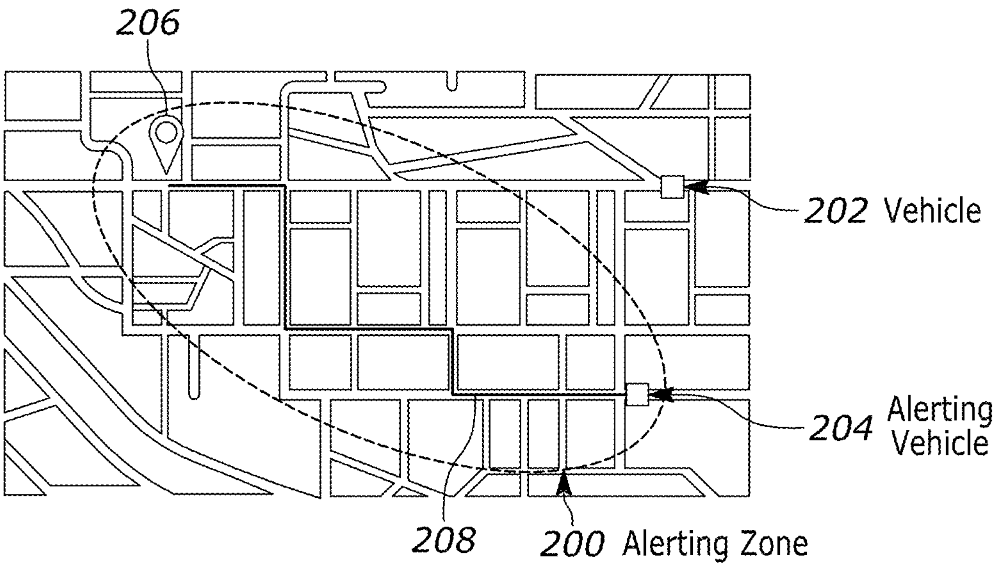
FIG. 2A depicts an example of a vehicle located outside an alerting zone.

FIG. 2A depicts an example of a vehicle 202 that is located outside of an alerting zone 200. In the example illustrated by FIG. 2A, the alerting zone 200 is a geographical area that surrounds an alerting vehicle 204. In the example, the alerting zone 200 is established in response to receiving an indication that an alerting vehicle has its warning lights on and includes a geographical area around a destination 206 of the alerting vehicle 204 and a projected path 208 of the alerting vehicle to the destination. The destination 206 may be, for example, an emergency site (e.g., a car accident, a structure fire, a crime site, or the like), a safety hazard (e.g., a weather hazard, a road closure, a lane closure, a road obstruction, or the like), or other similar roadway hazard. Because the vehicle 202 is located outside of the alerting zone 200, the safety cloud determines that the vehicle does not need to be alerted about the presence of the alerting vehicle 204. Thus, no alerting message is sent to the vehicle 202.

Figure 2B:
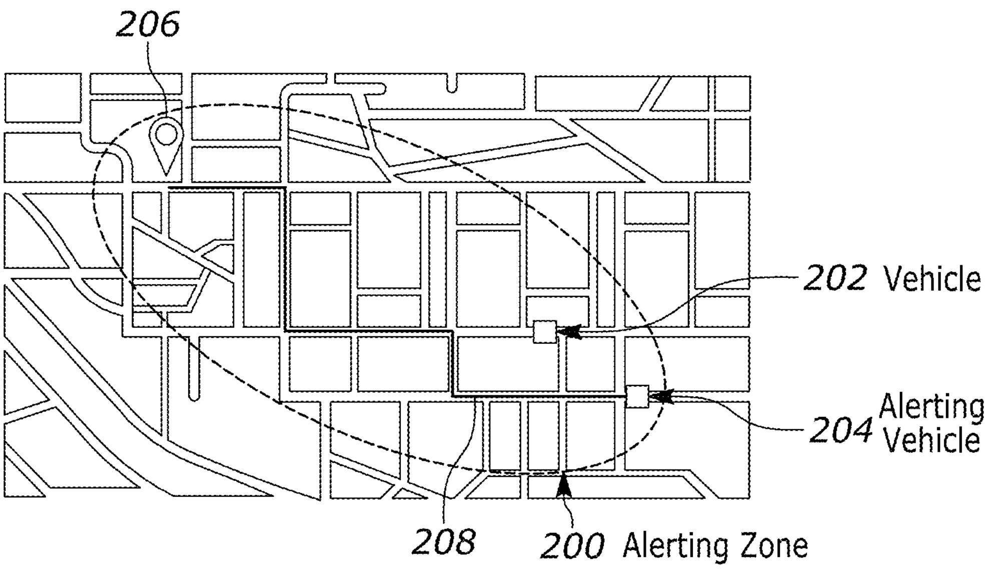
FIG. 2B depicts an example of a vehicle located in an alerting zone.

FIG. 2B depicts an example of the vehicle 202 being located in the alerting zone 200. In the example shown illustrated in FIG. 2B, the alerting zone 200 includes the alerting vehicle 204, the projected path 208 of the alerting vehicle, and the destination 206 of the alerting vehicle as described with reference to FIG. 2A. In contrast to FIG. 2A, the vehicle 202 shown in FIG. 2B is located in the alerting zone 200. Because the vehicle 202 is located in the alerting zone 200, the safety cloud determines that the vehicle needs to be alerted about the presence of the alerting vehicle 204. Thus, an alerting message is sent to the vehicle 202.

An example that illustrates the flow of data within a safety system, which is similar to the safety system 100 described with reference to FIG. 1, is described herein with reference to FIG. 3A-3E.

Figure 3A:
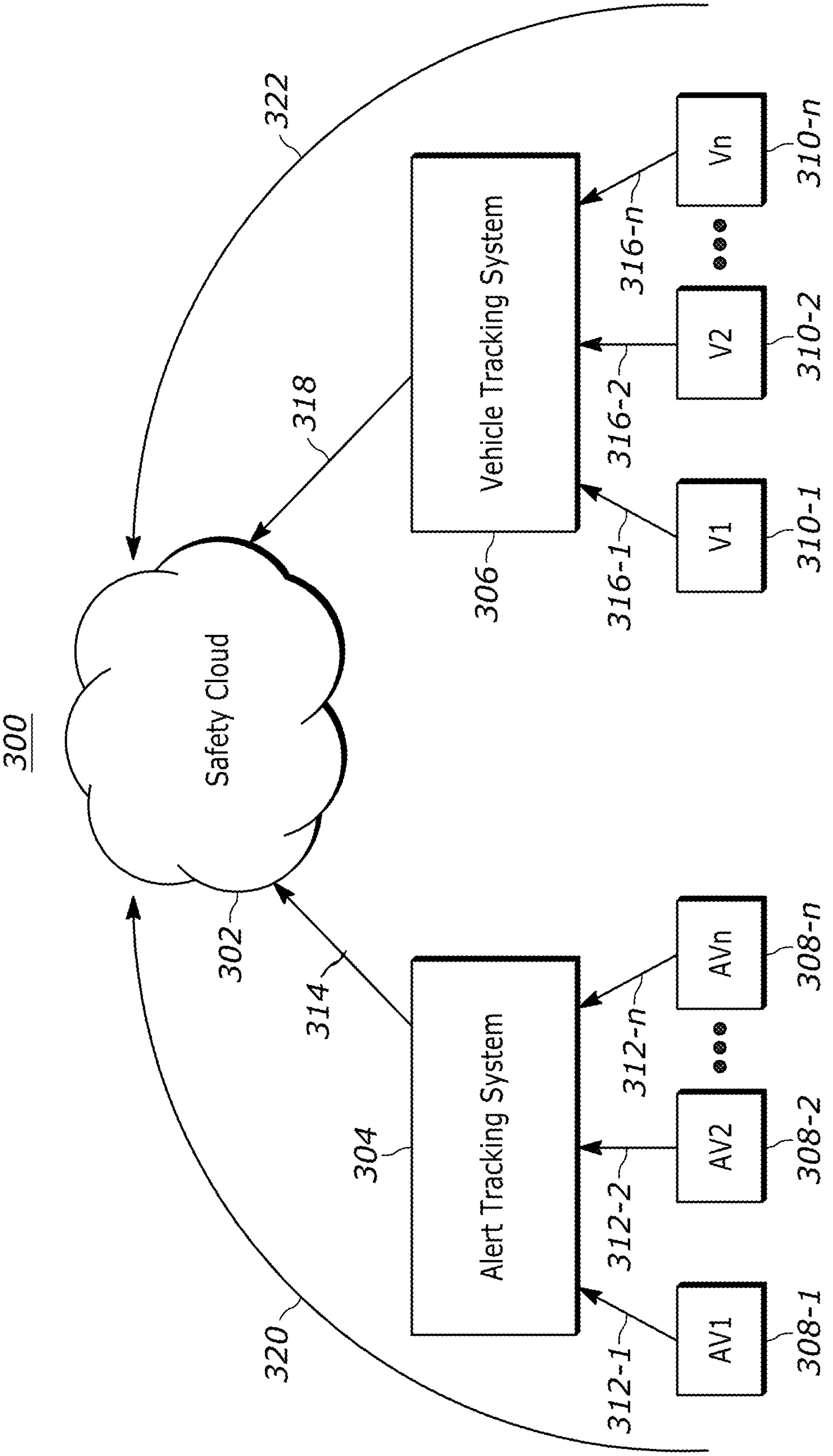
FIG. 3A illustrates the flow of data to a safety cloud.

FIG. 3A illustrates the flow of data to a safety cloud. The flow of data to the safety cloud may represent a process for collecting data (e.g., from alerting vehicles and from non-alerting vehicles). In particular, the example of FIG. 3A illustrates a safety system 300 that includes a safety cloud 302, an alert tracking system 304 that communicates with alerting vehicles AV1 308-1, AV2 308-2, and/or AVn 308-*n*, and a vehicle tracking system 306 that communicates with vehicles V1 310-1, V2 310-2, and/or Vn 310-*n* as described with reference to FIG. 1. The example of FIG. 3A illustrates the flow of data to the safety cloud 302. In an embodiment, alerting vehicles AV1 308-1, AV2 308-2, and/or AVn 308-*n* share alerting vehicle telemetry data with the alert tracking system 304 via wireless connections (represented by arrows 312-1, 312-2, and 312-*n*). In an example, the alerting vehicle telemetry data may include a vehicle ID, location information at a particular time (e.g., a timestamp and latitude and longitude coordinates), speed, acceleration, trajectory, direction, and/or azimuth, and an alert ID that corresponds to an alerting status/mode of an alerting vehicle, e.g., lights on/off. The alert tracking system 304 shares the alerting vehicle telemetry data with the safety cloud 302 (represented by arrow 314). In an embodiment, vehicles V1 310-1, V2 310-2, and/or Vn 310-*n* share vehicle telemetry data with the vehicle tracking system 306 at regular intervals (e.g., every 2 seconds) via wireless connections (represented by arrows 316-1, 316-2, and 316-*n*). In an example, the alerting vehicle telemetry data may include a vehicle ID, location information (e.g., timestamp and latitude and longitude coordinates), speed, acceleration, trajectory, direction, and/or azimuth, and an alert ID. The vehicle tracking system 306 shares the vehicle telemetry data with the safety cloud 302 (represented by arrow 318).

In some embodiments, alerting vehicles AV1 308-1, AV2 308-2, and/or AVn 308-*n* share alerting vehicle telemetry data directly with the safety cloud 302 (represented by arrow 320), and/or vehicle V1 310-1, V2 310-2, and/or Vn 310-*n* share vehicle telemetry data directly with the safety cloud 302 (represented by arrow 322). In such an embodiment, alerting vehicles AV1 308-1, AV2 308-2, and/or AVn 308-*n* share alerting vehicle telemetry data directly with the safety cloud 302 by bypassing the alert tracking system 304, and vehicles V1 310-1, V2 310-2, and/or Vn 310-*n* share vehicle telemetry data directly with the safety cloud 302 by bypassing the vehicle tracking system 306.

Although the alert tracking system 304 is described as sharing alerting vehicle telemetry data from alerting vehicles AV1 308-1, AV2 308-2, and/or AVn 308-*n*, the alert tracking system may also share vehicle telemetry data from other vehicles or devices (e.g., a roadside vehicle, a roadside sensor, a maintenance vehicle, a construction site device, drawbridge warning lights, railroad crossing gate/lights etc.). Additionally, the alerting vehicle telemetry data may correspond to other alert-related data such as, for example, a weather hazard, a lane closure, a road obstruction, a construction site, traffic, etc. In some embodiments, other parties may have access to the alert tracking system 304, such that the other parties (e.g., construction teams, utility teams, weather tracking teams, etc.) may tap into the alert tracking system and input/send alert-related data to the safety cloud 302 to indicate a safety hazard and/or an alerting zone. In such an embodiment, the other parties may input alert-related data that includes a specific location (e.g., an address or longitude and latitude coordinates) and/or a zone and an alert status (e.g., construction active, drawbridge up, railroad crossing gate down) to indicate the safety hazard and/or the alerting zone.

Figure 3B:
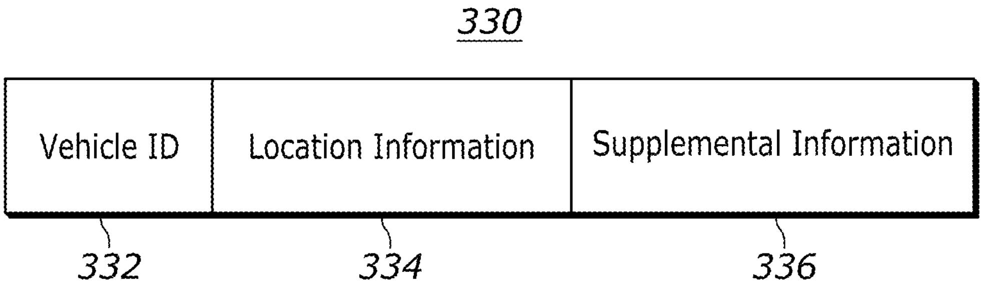
FIG. 3B is an example of a vehicle data message that is used to communicate vehicle telemetry data from a vehicle to the vehicle tracking system and/or to a safety cloud.

FIG. 3B is an example of a vehicle data message 330 that is used to communicate vehicle telemetry data from a vehicle (V1 310-1, V2 310-2, . . . Vn 310-*n*) to the vehicle tracking system 306 and/or to the safety cloud 302. In the example, the vehicle data message 330 includes three fields, implemented as a vehicle ID field 332, a location information field 334, and a supplemental information field 336. The vehicle ID field 332 may indicate a vehicle ID (e.g., a multibit vehicle identifier) that is unique to each vehicle (e.g., V1 310-1, V2 310-2, and/or Vn 310-*n*). The location information field 334 may indicate location information that corresponds to the location of the vehicle at a particular time, e.g., timestamp and latitude and longitude coordinates as provided from an on-vehicle GPS receiver). The supplemental information field 606 may include, for example, data indicative of motion of the vehicle such as speed, acceleration, trajectory, direction, and/or azimuth of the vehicle. Although the vehicle data message 330 is shown in FIG. 3B as including three fields, the vehicle data message may have more than or less than three fields that indicate the same or different information. In an embodiment, the vehicle data message 330 is sent by a vehicle (e.g., V1 310-1, V2 310-2, and/or Vn 310-*n*) to the vehicle tracking system 306 at regular intervals (e.g., every 2 seconds) via a wireless service provider network, and then shared with the safety cloud 302 by the vehicle tracking system. In another embodiment, the vehicle data message 330 is sent by a vehicle directly to the safety cloud via a wireless service provider network.

Figure 3C:
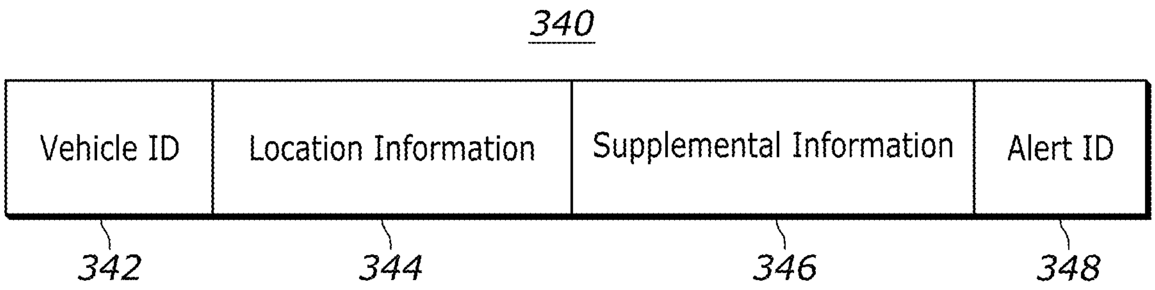
FIG. 3C is an example of an alerting vehicle data message that is used to communicate alerting vehicle telemetry data from an alerting vehicle to the alert tracking system and/or to the safety cloud.

FIG. 3C is an example of an alerting vehicle data message 340 that is used to communicate alerting vehicle telemetry data from an alerting vehicle (AV1 308-1, AV2 308-2, . . . AVn 308-*n*) to the alert tracking system 304 and/or to the safety cloud 302. In the example, the alerting vehicle data message 340 includes four fields, implemented as a vehicle ID field 342, a location information field 344, a supplemental information field 346, and an alert ID field 348. The vehicle ID field 342 may indicate a unique vehicle ID (e.g., a multibit vehicle identifier) that corresponds to an alerting vehicle (e.g., AV1 308-1, AV2 308-2, and/or AVn 308-*n*). The location information field 344 may indicate location information that corresponds to the location of the vehicle at a particular time (e.g., timestamp and latitude and longitude coordinates) as provided from an on-vehicle GPS receiver. The supplemental information field 346 may include, for example, data indicative of motion of the vehicle such as speed, acceleration, trajectory, direction, and/or azimuth of the vehicle. The alert ID field 348 may include an alert ID that indicates an alerting mode of the vehicle, e.g., whether the alerting vehicle has its emergency lights on or off and/or has its emergency siren on or off. In an example, the status of the emergency/warning lights of an alerting vehicle, as indicated by the value in the alert ID, is used to establish and remove alerting zones. For example, the safety cloud may establish an alerting zone and send digital alerts accordingly when the value in the alert ID field indicates that the alerting vehicle has its warning lights on, and the safety cloud may end an alerting zone and the corresponding alerting when the value in the alert ID field indicates that the alerting vehicle no longer has its warning lights on. Although the alerting vehicle data message 340 is shown in FIG. 3C as including four fields, the alerting vehicle data message may have more than or less than four fields that indicate the same or different information. In an embodiment, the alerting vehicle data message 340 is sent by an alerting vehicle (e.g., AV1 308-1, AV2 308-2, and/or AVn 308-*n*) to the alert tracking system 304 via a wireless service provider network, and then shared with the safety cloud 302 by the alert tracking system. In another embodiment, the alerting vehicle data message 340 is sent by an alerting vehicle directly to the safety cloud 302 via a wireless service provider network.

Figure 3D:
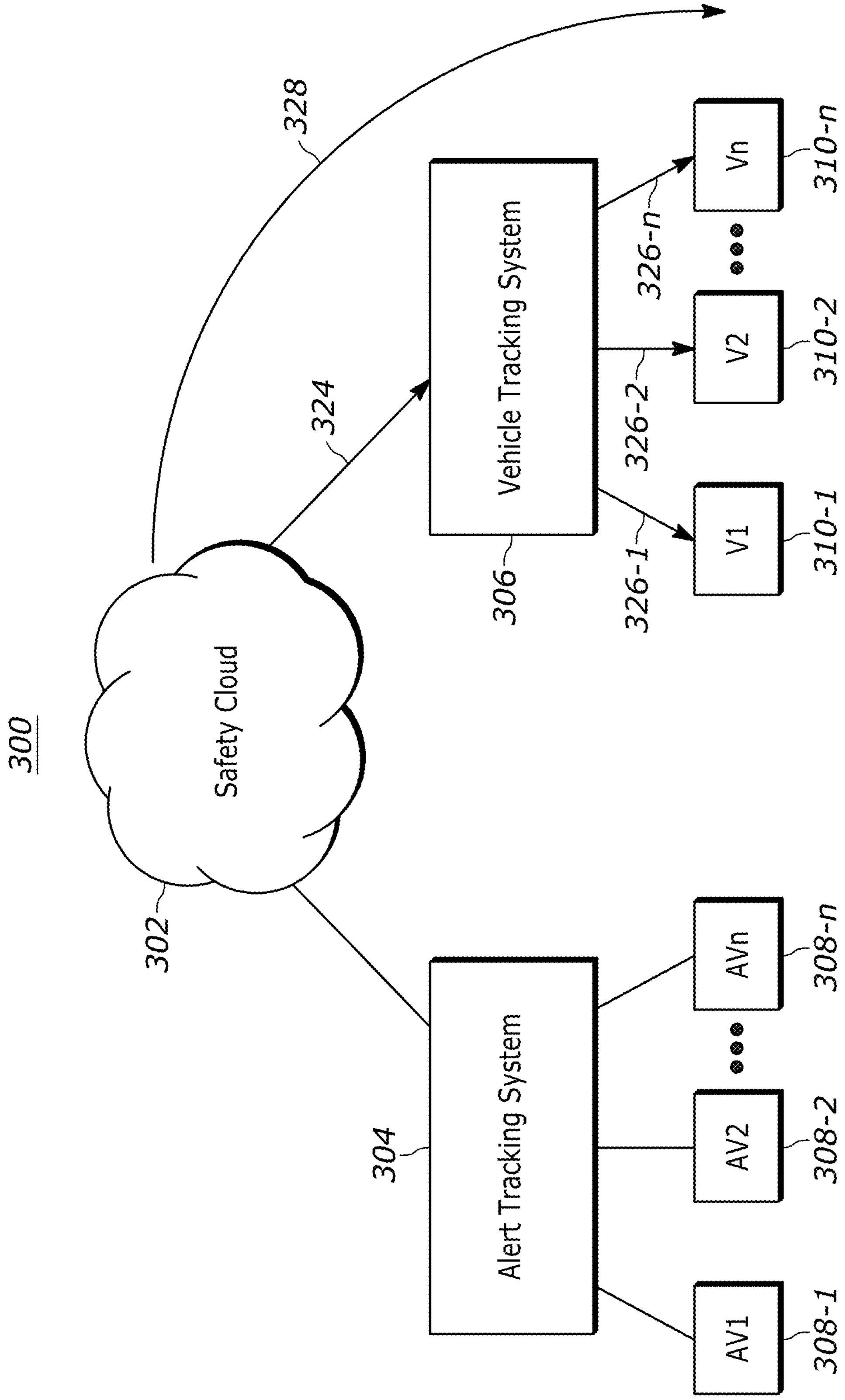
FIG. 3D illustrates the flow of data to vehicles from the safety cloud.

FIG. 3D illustrates the flow of data to vehicles. The flow of data to the vehicles may represent a process for sending digital alerts to the vehicles (V1 310-1, V2 310-2, and/or Vn 310-*n*). In particular, the example of FIG. 3D illustrates the safety system 300, including the safety cloud 302, the alert tracking system 304 that communicates with alerting vehicles AV1 308-1, AV2 308-2, and/or AVn 308-*n*, and the vehicle tracking system 306 that communicates with vehicles V1 310-1, V2 310-2, and/or Vn 310-*n* as described with reference to FIG. 3A. In contrast to FIG. 3A, the example of FIG. 3D illustrates the flow of data (e.g., digital alerts) from the safety cloud 302 to the vehicles V1 310-1, V2 310-2, and/or Vn 310-*n*. The safety cloud 302 may generate an alert message for transmission to vehicles V1 310-1, V2 310-2, and/or Vn 310-*n* when a vehicle is within an alerting zone. In an example, the safety cloud 302 sends a digital alert in the form of an alerting message to the vehicle tracking system 306 (represented by arrow 324) and the vehicle tracking system 306 sends a digital alert in the form of an alert message to corresponding vehicles V1 310-1, V2 310-2, and/or Vn 310-*n* via wireless connections (represented by arrows 326-1, 326-2, and 326-*n*). In another example, the safety cloud 302 sends a digital alert directly to a corresponding vehicle V1 310-1, V2 310-2, and/or Vn 310-*n* via a wireless connection (represented by arrow 328). In some embodiments, the same alert message is sent to all the vehicles that are included in the safety system 300 and within an active alerting zone. In some embodiments, an alert message is vehicle-specific, such that a different vehicle-specific alert message is sent to each of the vehicles that is within an alerting zone.

Figure 3E:
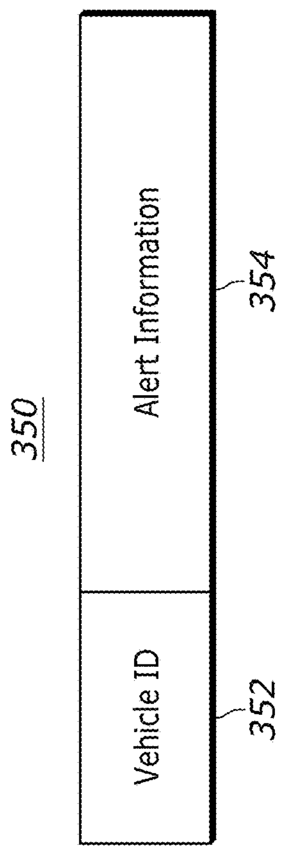
FIG. 3E depicts an example of an alert message that is generated by the safety cloud.

FIG. 3E depicts an example of a digital alert in the form of an alert message 350 that is generated by the safety cloud 302. In the example, the alert message 350 shown in FIG. 3E includes two fields, implemented as a vehicle ID field 352 and an alert information field 354. The vehicle ID field 352 may indicate a vehicle ID that is unique to each vehicle (e.g., V1 310-1, V2 310-2, and/or Vn 310-*n*), such that the vehicle ID is vehicle-specific. By using the vehicle ID, the alert message indicates which particular vehicle the alert message is intended for. Thus, the vehicle ID may improve the overall impact of alert messages because only the intended vehicle will recognize the digital alert as being intended specifically for that vehicle. The alert information field 354 may indicate an alert type. In one example, the alert information field 354 may be a single bit field and in other examples, the alert information field 354 may be a multibit field. In one example, there may be multiple different types of alert messages and in another example, there is only one type of alert message. In an embodiment, the alert information field 354 has a value that indicates a warning such as “beware of hazard,” “fire truck ahead,” “police car ahead,” “tow truck ahead,” “lane closure ahead,” “construction ahead,” or the like. Although the alert message 350 is shown in FIG. 3E as including two fields, the alert message may have more than or less than two fields that indicate the same or different information. In an embodiment, the alert message 350 is sent to the vehicle tracking system 306 by the safety cloud 302, and then sent by the vehicle tracking system to a transceiver of a vehicle (e.g., V1 310-1, V2 310-2, and/or Vn 310-*n*) via a wireless service provider network. In another embodiment, the alert message 350 is sent by the safety cloud to the transceiver of the vehicle via the wireless service provider network. In yet another embodiment, the alert message 350 is sent by the safety cloud to a broadcasting tower near an alerting zone via the wireless service provider network, and then sent by the broadcasting tower to the transceiver of the vehicle via a wireless service provider network.

As described above, the safety system provides digital alerts to vehicles to notify the vehicles of nearby hazards. Although the safety system is described as applying to alerting vehicles such as police cars, fire trucks, ambulances, and tow trucks, the safety system can be extended to provide digital alerting for a wide variety of hazards, including, for example, vehicle hazards such as school buses and mail trucks, and non-vehicle hazards such as construction zones, roadside hazards, and natural phenomena such as wildfires and floods. The safety system typically provides digital alerts according to digital alerting rules and in large-scale deployments with many different types of hazards and many different types of digital alerting rules, it can be difficult to know if the digital alerting rules are in fact improving safety on the roadways.

In conventional digital alerting systems, there may be some reliable information on digital alerting, including when digital alerts were issued and what vehicles received the digital alerts. However, heretofore, there has not been a way to understand the impacts of digital alerting that is reliable and that can be scaled over large cloud-based deployments. The safety system described herein collects a wide range of telemetry data from vehicles that are tracked by the safety system. For example, the safety system collects data about alerting vehicles, data about non-alerting vehicles, and data about digital alerts that have been provided to vehicles in the safety system. It has been realized that such extensive knowledge about vehicles and digital alerts can be used to determine post-alert behaviors of vehicles, which can in turn be used by the safety system to modify digital alerting rules based on the post-alert behaviors of the vehicles to improve safety on the roadways. For example, digital alerting rules of the safety system can be automatically modified by the safety system based on post-alert behavior to drive subsequent vehicle behaviors that meet a predefined safety principle, or set of safety principles. Such an intelligent and automated system can be implemented over large-scale digital alerting systems to improve safety on the roadways. For example, the intelligent and automated system can be implemented to make real-time modifications of thousands of vehicle alerting rules based on the post-alert behaviors of thousands, if not tens or hundreds of thousands of vehicles in real time. It would be impractical if not impossible for such a large scale implementation of intelligent digital alerting rules management to be implemented in a human mind. Thus, the techniques disclosed herein have a practical application to digital vehicle alerting systems that improve roadway safety.

In one example, the modification of a digital alerting rule is influenced by a safety principle that vehicles should receive a digital alert regarding a hazard 15-20 seconds before the hazard is encountered by the vehicle. Given the wealth of information that is collected by the safety system, it is possible for the safety system to continuously monitor post-alert behavior of vehicles and to automatically modify a digital alerting rule so that the safety principle is more likely to be met for subsequent alerting events. For example, one post-alert behavior that can be determined from the data collected by the safety system is the time interval between when a digital alert is provided to a vehicle and when the vehicle actually encounters the corresponding hazard. Specifically, such post-alert behavior can be reliably determined by the safety system from alert data, which includes a timestamp and location of the hazard, and vehicle telemetry data, which includes time stamped location data. In an example, a digital alerting rule implements an alerting zone around a hazard and sends digital alerts to vehicles that are within the alerting zone. For example, the alerting zone may be quantified as a distance of 1,000 feet from the hazard. If the determined post-alert behavior of a vehicle that received a digital alert indicates that the vehicle was alerted too late (e.g., less than 15 seconds before encountering the hazard), then the digital alerting rule can be modified by the system to enlarge the alerting zone around the hazard and if the determined post-alert behavior indicates that the vehicle was alerted too early (e.g., more than 20 seconds before encountering hazard), then the digital alerting rule can be modified by the system to reduce the alerting zone around the hazard. For example, the distance of 1,000 feet specified in the digital alerting rule could be increased beyond 1,000 feet to increase an alert time buffer or the distance of 1,000 feet specified in the digital alerting rule could be reduced below 1,000 feet to decrease the alert time buffer. Because the safety system collects a rich set of data about digital alerts that are provided throughout the safety system and about vehicles that are tracked by the safety system, post-alert behavior can be determined by the safety system with certainty and used by the safety system with confidence to automatically modify digital alerting rules towards a goal of achieving certain predefined safety principles for subsequent alerting events. Thus, a large safety system can automatically and intelligently adjust its digital alerting rules with the goal of achieving certain predefined safety principles.

An example of modifying a digital alerting rule based on post-alert behavior is now described with reference to a school bus scenario. In one implementation, the safety system is configured to provide digital alerts to vehicles that are approaching a school bus that has stopped on the side of a road for loading and/or unloading of passengers. In this case, upon stopping to load/unload passengers, the school bus may send a message to the safety cloud that includes data such as described with reference to FIG. 3C, where the alert ID indicates that the school bus has stopped to load/unload passengers. Upon receiving the message, the safety cloud determines if any vehicles are within an alerting zone of the school bus (e.g., within 1,000 feet of the school bus), provides digital alerts to any vehicles that are within the alerting zone, and also provides digital alerts to any vehicles that enter the alerting zone while the hazard is still active (e.g., as long as the school bus indicates that it is stopped for loading/unloading). Because the safety system has telemetry data about the digital alert (e.g., location information, timestamp, and alert ID), knowledge of what vehicles received the digital alert, and telemetry data about the vehicles that received the digital alert (e.g., vehicle ID, location information, timestamp), the safety system can determine some post-alert behavior of vehicles that received the digital alert. For example, the safety system can determine the time interval between when a particular vehicle was provided the digital alert and when the vehicle encountered the school bus (assuming the school bus is still in the same location) or encountered the location where the school bus was when the alert message was issued. If the determined time interval meets the pre-established safety principle of, for example, 15-20 second alert time buffer, then the digital alerting rule does not need to be modified. For example, it can be assumed that the size of the alerting zone was sufficient to meet the safety principle of a 15-20 second alert time buffer. However, if the determined time interval was less than seconds, then the size of the alerting zone could be increased, with the goal of increasing the alert time buffer, and if the determined time interval was greater than 20 seconds, then the size of the alerting zone could be decreased, with the goal of decreasing the alert time buffer. If the digital alerting rule is in fact modified based on the post alert-behavior of a vehicle, then the modified digital alerting rule is provided to a rules engine of the safety system for subsequent use in digital alerting with the goal that subsequent digital alerts will result in the desired post-alert behavior, e.g., alerting vehicles 15-20 seconds before encountering the corresponding hazard. The school bus example is one example of how the telemetry data collected by the safety system can be used by the safety system to determine post-alert behavior and to automatically modify a digital alerting rule based on the post-alert behavior. It should be recognized that various different types of post-alert behaviors and various different types of safety principles can be considered when determining whether or not to modify digital alerting rules in a cloud-based safety system. Other examples of post-alert behavior and safety principles are described herein.

In the example provided above, a digital alerting rule is modified based on post-alert behavior of a single vehicle. In other examples, post-alert behavior can be determined for multiple vehicles and digital alerting rules may be modified based on the post-alert behavior of multiple vehicles. For example, various statistics may be generated (e.g., average time to encounter, mean time to encounter) and decisions on modifying digital alerting rules may be made based on comparing statistical values to safety principles. In another example, machine learning (ML) and/or artificial intelligence (AI) may be used to determine if digital alerting rules should be modified and/or to determine how to modify the digital alerting rules. In an example, ML/AI may be applied to post-alert behavior data and used to predict that certain digital alerting rules should be modified.

Although some examples are provided, there are many ways that post-alert behavior can be accumulated, batched, and/or processed for use in determining whether or not to modify digital alerting rules.

Figure 4:
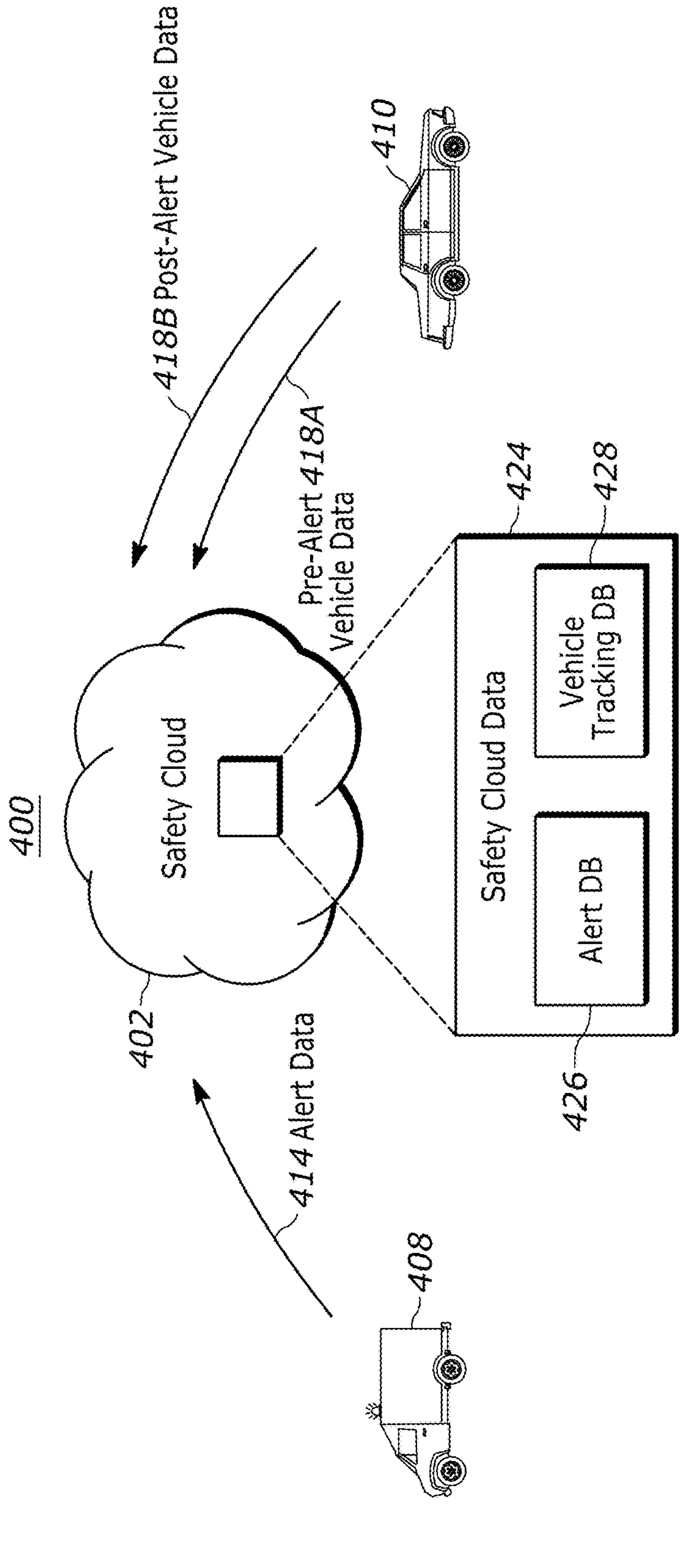
FIG. 4 illustrates an example of data that is collected at a safety cloud of a safety system and used by the safety system to modify digital alerting rules.

FIG. 4 illustrates an example of data 424 that is collected at a safety cloud 402 of a safety system 400 and used by the safety system to modify digital alerting rules. In the example, the data that is collected by the safety cloud includes alert data, which is held in computer memory in an alert database 426, and a vehicle telemetry data, which is held in computer memory in a vehicle tracking database 428. In an example, the alert database and/or the vehicle tracking database are stored in a relational database hosted by a cloud services provider. For example, the databases and corresponding data are stored in computer memory managed by a cloud service provider such as AMAZON®, GOOGLE®, and MICROSOFT®.

As illustrated in FIG. 4, alert data 414 is provided to the safety cloud 402 from an alerting vehicle 408 and vehicle telemetry data 418A and 418B is provided to the safety cloud from a non-alerting vehicle 410. Of course, the safety system may support multiple alerting vehicles, multiple non-alerting vehicles, and multiple non-vehicle devices, which provide relevant data to the safety cloud. In some examples, alert data may also be provided from devices that are not part of a vehicle, such as roadside warning signs, fire sensors, or flood sensors. In an example, the alert database is populated using telemetry data from messages such as those described with reference to FIGS. 3C and 3E and the vehicle tracking database is populated using telemetry data from vehicle information messages such as those described with reference to FIGS. 3B and 3C. As is described further below, because timing information is known about the digital alerts and about the tracked vehicles, the vehicle telemetry data that is collected by the safety cloud can be categorized as pre-alert vehicle telemetry data or post-alert vehicle telemetry data.

Figure 5:
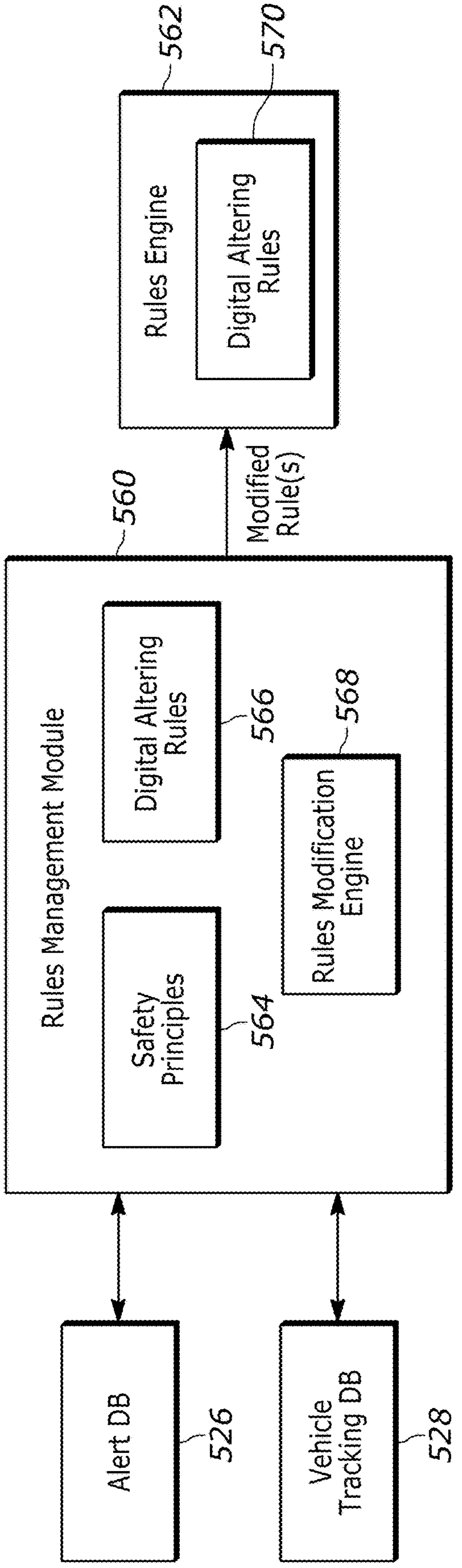
FIG. 5 depicts components of a safety cloud that are configured to implement intelligent management of digital alerting rules.

FIG. 5 depicts components of a safety cloud that are configured to implement intelligent management of digital alerting rules. The components include an alert database 526, a vehicle tracking database 528, a rules management module 560, and a rules engine 562. In an example, the alert database and the vehicle tracking database are similar to, or the same as, the alert database 426 and the vehicle tracking database 428 described with reference to FIG. 4.

The rules management module 560 includes safety principles 564, digital alerting rules 566, and a rules modification engine 568. In an example, the rules management module is embodied in computer readable code that is executed on a processor or processors, in, for example, a cloud computing environment such as the safety cloud described herein.

In an example, the safety principles 564 of the rules management module 560 are quantified safety parameters that are desirable to be met in order to enhance the safety of roadways. The safety principles can be met through implementation of digital alerting rules. One example of a safety principle is that vehicles, or some device within a vehicle, should receive a digital alert corresponding to a particular hazard 15-20 seconds before the hazard is encountered by the vehicle, referred to as an alert time buffer. With regard to the alert time buffer of 15-20 seconds, in some cases it is believed that alerting a vehicle less than 15 seconds before encountering a hazard may not provide enough time for an operator of the vehicle to take an appropriate action (e.g., to slow down) and alerting a vehicle more than 20 seconds before encountering a hazard may provide too much time such that the operator of the vehicle may forget about the hazard or may become distracted by something else. In one example, a vehicle is considered to have encountered a hazard when the vehicle is within 60 feet of the hazard although an encounter may be determined by other criteria. In another example, a vehicle is considered to have encountered a hazard when the hazard is visible to an operator of the vehicle or when the hazard is detectable by an on-vehicle sensor (e.g., camera or radar) of the vehicle.

Although an alert time buffer is one example of a safety principle, other safety principles may be considered to determine whether or not a digital alerting rule should be modified. Examples of safety principles that may be maintained within the rules management module include:

- minimum time to encounter quantified in seconds (e.g., alert provided to vehicles at least 15 seconds before encounter);
- desired time window to encounter with hazard quantified as a time window of seconds (e.g., 15-20 seconds);
- maximum acceptable deceleration quantified as a deceleration threshold (e.g., want to avoid hard braking of alerted vehicles);
- minimum time to deceleration quantified as a combination of a deceleration threshold and a number of seconds (e.g., want to see deceleration of alerted vehicles at least 15 seconds before encounter);
- maximum change in direction, or rate of change quantified as a change in azimuth values (e.g., want to avoid swerving by alerted vehicles near the hazard);
- minimum time to lane change quantified as a combination of change in azimuth values and a time interval in seconds (e.g., want to avoid last second lane changes by alerted vehicles near the hazard); and
- desired speed of 20-25 miles per hour in vicinity of hazard (e.g., want to see a specific speed of alerted vehicles when near stopped bus or mail truck).

More than one safety principle may be applicable to one digital alerting rule. For example, more than one of the above-identified safety principles may be applicable to a digital alerting rule that corresponds to a fleet of school buses. The process of determining whether or not to modify the digital alerting rule may involve determining multiple different post-alert behaviors and doing multiple different comparisons of the post-alert behaviors to the corresponding safety principles. In an example, the digital alerting rule is modified if at least one of the post-alert behaviors does not meet the corresponding safety principle although other modification rules could be implemented.

In an example, the digital alerting rules 566 of the rules management module 560 are computer executable rules that control the generation and distribution of digital alerts within the safety system. The digital alerting rules can be, for example, specific to various different parameters, including specific to certain types of alerting vehicles, specific to certain types of hazards, specific to certain customers, and/or specific to certain non-alerting vehicles. For example, there may be a specific digital alerting rule related to police cars from city A, a specific digital alerting rule related to fire trucks from city A, a specific digital alerting rule related to police cars from city B, and a specific digital alerting rule related to fire trucks from city B. In fact, in a large safety system, it is expected that there may be hundreds or even thousands of specific digital alerting rules that are active throughout the safety system. Such a large number of digital alerting rules can be very difficult to manage manually by humans that oversee operation of the safety system.

The rules modification engine 568 of the rules management module 560 is configured to determine if specific digital alerting rules should be modified in view of post-alert behavior. In one example, the rule modification engine determines a post-alert behavior of a vehicle that was provided a digital alert from a digital alerting system using 1) a time that the digital alert was provided to the vehicle from the digital alerting system, and 2) vehicle telemetry data that was received at the digital alerting system from the vehicle. The rules modification engine then modifies a digital alerting rule based on the post-alert behavior and updates a rules engine of the digital alerting system with the modified digital alerting rule. The rules engine can then implement the modified digital alerting rule for subsequent digital alerting events in the safety system. As described herein, the automated management of the digital alerting rules by the safety system based on post-alert behavior and safety principles enables the safety system to efficiently and intelligently modify digital alerting rules in a dynamic manner that is driven by the safety principles. In an example, the rules modification engine may use ML and/or AI to determine if digital alerting rules should be modified and/or to determine how to modify the digital alerting rules. In an example, ML/AJ may be applied to post-alert behavior data and used to predict that certain digital alerting rules should be modified.

The rules engine 562 of the safety cloud is configured to implement digital alerting rules 570 to provide digital alerts as described herein. In an example, the rules engine is implemented in the safety cloud through computer executable code to provide digital alerting as described herein. In an example, the rules engine applies digital alerting rules to the alert data and to the vehicle telemetry data that is collected by the safety cloud to determine when to provide digital alerts to vehicles and to determine which vehicles will be provided the digital alerts.

Although an example of a rules management module is described with reference to FIG. 5, the process of implementing intelligent rules management based on post-alert behavior can be implemented in systems with other components. Additionally, components of a rules management module may be distributed throughout a safety cloud and processes may be implemented in series, in parallel, or some combination of series and parallel.

Figure 6:
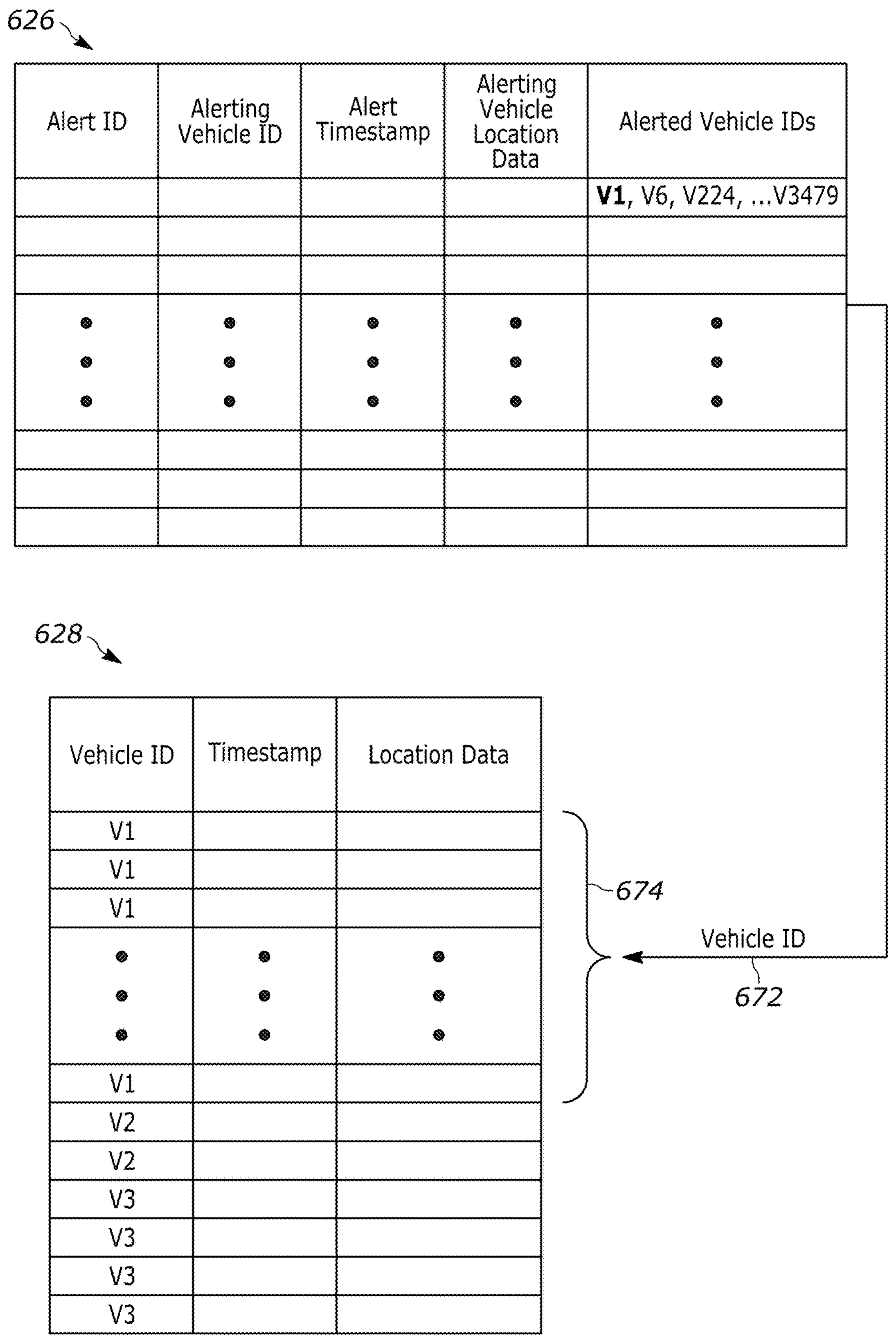
FIG. 6 depicts an example of alert data and vehicle telemetry data and illustrates a set of vehicle data in the vehicle telemetry data that is linked to a particular digital alert in the alert data.

FIG. 6 depicts an example of alert data 626 and vehicle telemetry data 628 and illustrates a set of vehicle data in the vehicle telemetry data that is linked to a particular digital alert in the alert data. As depicted in FIG. 6, the alert data includes rows of alert entries and columns of different types of data corresponding to each alert entry. In the example, each entry of the alert data includes an alert ID, an alert type, an alerting vehicle ID, an alert timestamp, alerting vehicle location information (e.g., latitude and longitude coordinates), and alerted vehicle IDs. The alert ID may include a unique identifier (e.g., a serial number) of the alert, an alert type, and/or an alert state/mode, the alerting vehicle ID is a vehicle ID corresponding to the vehicle that is the hazard, the alert timestamp is a timestamp corresponding to the alert, the alerting vehicle location data is location information (e.g., latitude and longitude coordinates) of the alerting vehicle at a time that corresponds to the timestamp, and the alerted vehicle IDs includes the vehicle ID of each vehicle that was provided a digital alert that corresponds to the alert entry. In an example, the alert ID, the alerting vehicle ID, the alert timestamp, and the alerting vehicle location information are telemetry data provided from alerting vehicles and the alerted vehicle IDs are determined at the safety cloud and associated with a particular entry in the alert database. In an example, the alert data is held in an alert database such as the alert databases 426 and 526 described with reference to FIGS. 4 and 5. Although an example of alert data is described with reference to FIG. 6, the alert data may include more or less data, and/or different types of data. Additionally, although specific entries may not be shown in FIG. 6 at the intersections of the rows and columns, it should be understood that the such a data set can include multiple entries that convey the corresponding information. For example, an alert ID may be some multibit value, an alerting vehicle ID may be some multibit value that uniquely identifies an alerting vehicle, a timestamp may be a timestamp value as is known in the field, an alerting vehicle location data may be GPS location data as is known in the field, and an alerted vehicle ID may be a multibit value that uniquely identifies a vehicle. In an example, the location data may be stored in decimal degrees (DD) format, degrees, minutes, and seconds format (DMS), and/or degrees and decimal minutes (DMM) format.

In the example of FIG. 6, each entry of the vehicle telemetry data 628 includes a vehicle ID, a timestamp corresponding to the entry, and location information (e.g., latitude and longitude coordinates) of the vehicle at the time that corresponds to the timestamp. In an example, the vehicle telemetry data is held in a vehicle tracking database 428 and 528 such as that described with reference to FIGS. 4 and 5. Although an example of vehicle telemetry data is described with reference to FIG. 6, the vehicle telemetry data may include more or less data and/or different types of data.

In the example of FIG. 6, the entry in row 1 of the alert data 626 indicates that a vehicle with the vehicle ID of "V1" is a vehicle that received the digital alert identified in row 1 of the alert data. As illustrated by the arrow 672 in FIG. 6, the vehicle ID, V1, from the alerting data can be used to identify vehicle telemetry data that corresponds to the vehicle, V1, in the vehicle telemetry data. For example, the vehicle ID is used as a search key to search a vehicle tracking database for matching entities. The vehicle telemetry data that corresponds to vehicle, V1, includes a time-series of vehicle telemetry entries as indicated by the bracket 674. Thus, FIG. 6 illustrates an example of how a set of time-series vehicle telemetry data for a vehicle that received a particular digital alert can be linked to the particular digital alert. That is, FIG. 6 illustrates how an entry in an alert database can be used by the safety system to locate specific vehicle telemetry data in a vehicle tracking database.

Figures 7, 8:
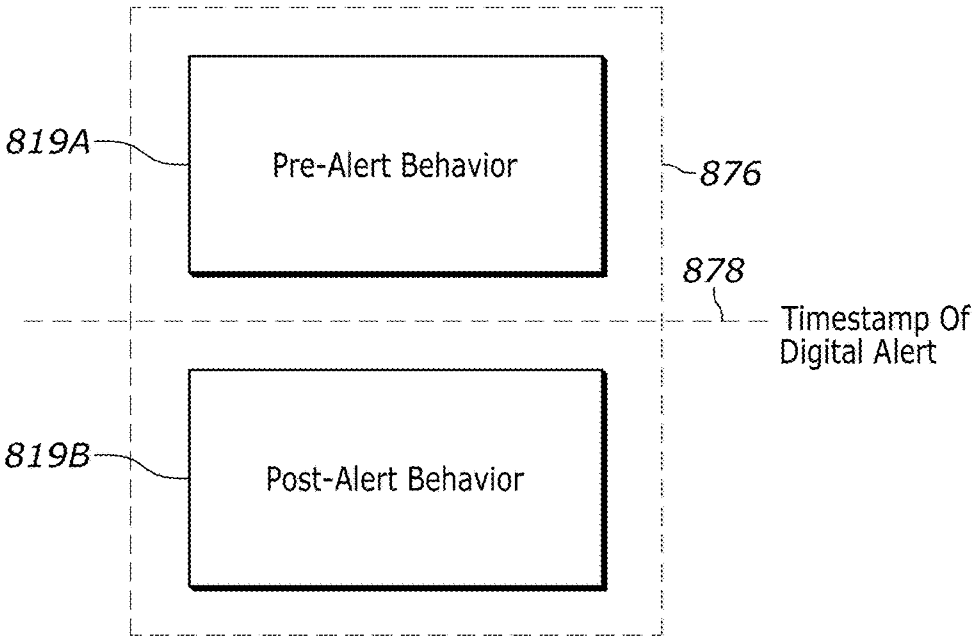
FIG. 7 depicts a set of time-series vehicle telemetry data that is linked to a particular digital alert relative to a timestamp of the digital alert as described with reference to FIG. 6.
FIG. 8 illustrates behavior of a vehicle that is determined from the time-series vehicle telemetry data described with reference FIG. 7 relative to the timestamp of the digital alert.

FIG. 7 depicts the set of time-series vehicle telemetry data 774 that is linked to a particular digital alert relative to a timestamp of the digital alert as described with reference to FIG. 6. In the example of FIG. 7, the timestamp of the digital alert is shown relative to the time-series vehicle telemetry data. In particular, the point in time at which the digital alert was provided to the vehicle is identified relative to the entries of the time-series vehicle telemetry data as being between timestamp, t5, and timestamp, t6. Vehicle telemetry data that was generated earlier in time than the timestamp of the digital alert is considered pre-alert data 718A and vehicle telemetry data that was generated later in time than the timestamp of the digital alert is considered post-alert data 718B. The pre-alert data can be used to determine pre-alert behavior of the vehicle and the post-alert data can be used to determine post-alert behavior of the vehicle. Additionally, although specific entries may not be shown in FIG. 7 at the intersections of the rows and columns, it should be understood that the such a data set can include multiple entries that convey the corresponding information. For example, a vehicle ID may be some multibit value that uniquely identifies a vehicle, a timestamp may be a timestamp value as is known in the field, and location data may be GPS location data as is known in the field. In an example, the location data may be stored in DD format, DMS, and/or DMM format.

FIG. 8 illustrates behavior 876 of the vehicle, V1, that is determined from the time-series vehicle telemetry data 774 described with reference FIG. 7 relative to the timestamp of the digital alert. In FIG. 8, the dashed line 878 represents the timestamp of the digital alert, pre-alert behavior 819A is represented above the dashed line, and post-alert behavior 819B is represented below the dashed line. The pre-alert behavior is determined from the pre-alert data (FIG. 7, 718A) and the post-alert behavior is determined from the post-alert data (FIG. 7, 718B). Thus, as described with reference to FIGS. 6-8, because the safety system has timestamped data about digital alerts and timestamped vehicle telemetry data, it is possible to reliably determine post-alert behaviors of vehicles, which can be used to intelligently manage digital alerting rules.

Figure 9:
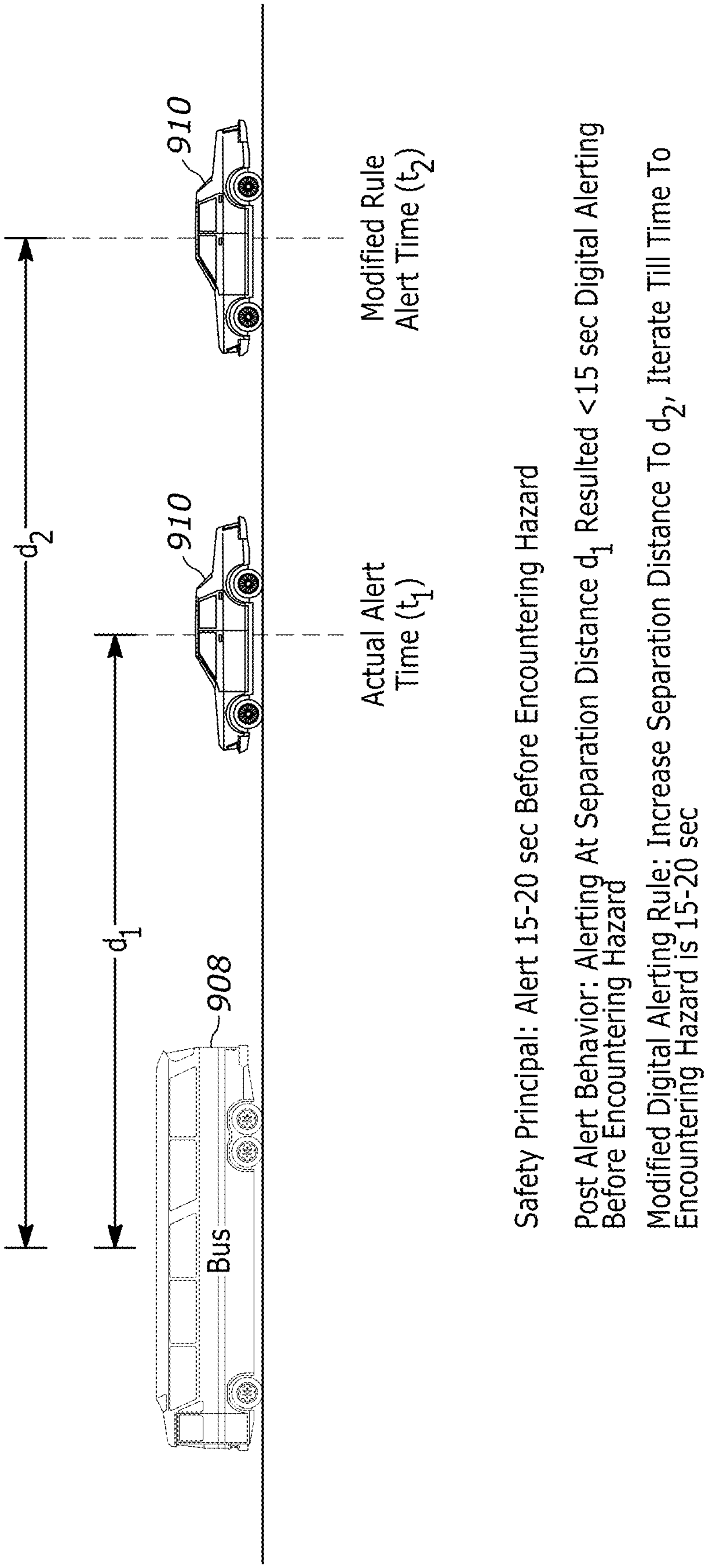
FIG. 9 illustrates an example of how a digital alerting rule can be automatically modified by a safety system based on post-alert behavior.

FIG. 9 illustrates an example of how a digital alerting rule can be automatically modified by a safety system based on post-alert behavior of a vehicle and in view of a safety principle. In the example, the safety principle calls for a digital alert corresponding to a hazard to be provided to a vehicle 15-20 seconds before the vehicle encounters the hazard, the hazard is a school bus 908 that has stopped near the side of a road to load/unload passengers, and the digital alerting rule that applies to the school bus is that a vehicle 910 should be provided a digital alert when the vehicle enters an alerting zone around the school bus that is defined by, for example, a separation distance of, d1, e.g., 1,000 feet, between the school bus and the vehicle.

In an example, a separation distance is a parameter of a digital alerting rule because a separation distance between a hazard and a vehicle at a particular moment in time can be quickly and definitively calculated in the safety cloud using timestamps and the corresponding location information (e.g., the latitude and longitude coordinates) of the hazard and the vehicle. For example, the distance between two different locations (e.g., as indicated by latitude and longitude coordinates) is easy to calculate given location information about the hazard and location information about an oncoming vehicle that are collected at the same time (e.g., within 1-3 seconds of each other). Thus, separation distance between a hazard and an oncoming vehicle can be a good metric to implement in a digital alerting rule. In contrast, a digital alerting rule that is time-based, such as a digital alerting rule that calls for a digital alert to be provided 15-20 seconds before encountering the hazard, would need to predict a time to encounter between the hazard and the vehicle, e.g., using velocity information. Such a prediction can be more difficult to make in the tight time windows that are needed to alert oncoming vehicles in a timely manner and such predictions can be unreliable. Thus, separation distance is a metric that is beneficial to incorporate into a digital alerting rule at least because the separation distance can be quickly and definitively calculated from the telemetry data that is collected at the safety cloud. As described herein, the time to encounter a hazard can be better achieved as a safety principle that drives modification of the parameter of separation distance, which is incorporated into a digital alerting rule.

Referring back to the example illustrated in FIG. 9, the vehicle, V1, 910 received a digital alert when the separation distance between the vehicle and the school bus 908 was d1, e.g., 1,000 feet, and post-alert data was used to determine the post-alert behavior of the vehicle. Specifically, the post-alert data was used to determine the time interval between when the digital alert was provided to the vehicle and when the vehicle encountered the hazard (e.g., encountered the school bus). In the example, the time interval between when the digital alert was provided to the vehicle and when the vehicle encountered the hazard was less than 15 seconds, which does not meet the safety principles since it is not within the desired alert buffer time of 15-20 seconds. Because the time interval between when the digital alert was provided to the vehicle and when the vehicle encountered the hazard was less than the alert time buffer of 15-20 seconds, the separation distance parameter of the digital alerting rule was modified to increase the separation distance to d2, e.g., 1,200 feet. The modified digital alerting rule is updated in the rules engine of the safety cloud and implemented for subsequent alerts of school bus hazards. If application of the modified digital alerting rule results in the safety principle being met for subsequent digital alerting events, then the digital alerting rule does not need to be modified again. However, if application of the modified digital alerting rule to subsequent digital alerting events does not result in the safety principle being met, then the digital alerting rule may be modified again.

In an example, the digital alerting rule described above with reference to FIG. 9 can be expressed in computer executable instructions as:

if post-alert time to encounter hazard ≠15-20 seconds,
  then, change separation distance,
    if time to encounter <15 seconds, then increase separation distance by 200 feet,
    if time to encounter >20 seconds, then decrease separation distance by 200 feet,
if post-alert time to encounter=15-20 seconds, then, end.

Figure 10:
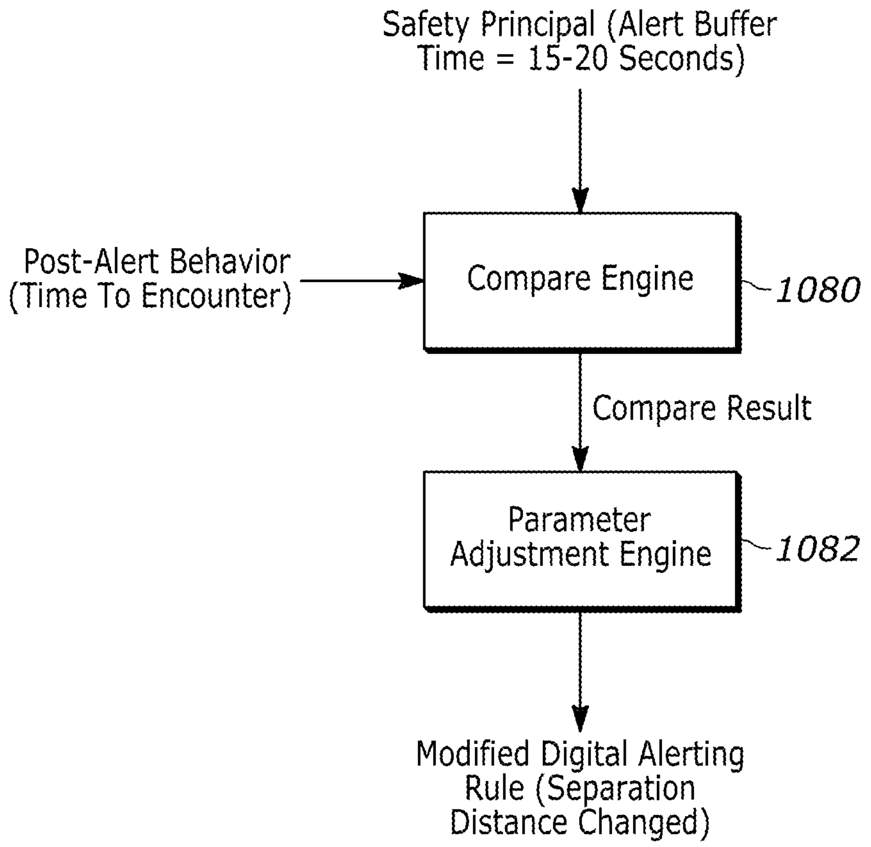
FIG. 10 is a functional block diagram of example components of the rules modification engine described with reference to FIG. 5.

FIG. 10 is a functional block diagram of example components of the rules modification engine 568 described with reference to FIG. 5. As illustrated in FIG. 10, a compare engine 1080 compares a safety principle (e.g., desired time interval to encounter the hazard) to a post-alert behavior (e.g., actual time interval in which the hazard was encountered) that was determined from 1) a time that the digital alert was provided to the vehicle from the digital alerting system, and 2) vehicle telemetry data that was received at the digital alerting system from the vehicle. A parameter adjustment engine 1082 modifies a digital alerting rule based on a compare result from the compare engine. In an example, the parameter adjustment engine includes parameter modification rules that control how parameters of digital alerting rules are adjusted based on a compare result. For example, the parameter adjustment engine may implement the adjustment rules with regard to separation distance of:

if time to encounter <15 seconds, then increase separation distance by 200 feet, if time to encounter >20 seconds, then decrease separation distance by 200 feet.

A modified digital alerting rule is output from the parameter adjustment engine. The Modified Digital Alerting Rule can be Applied by a Rules Engine in the Safety System to Subsequent Digital Alerting Events.

Figure 11:
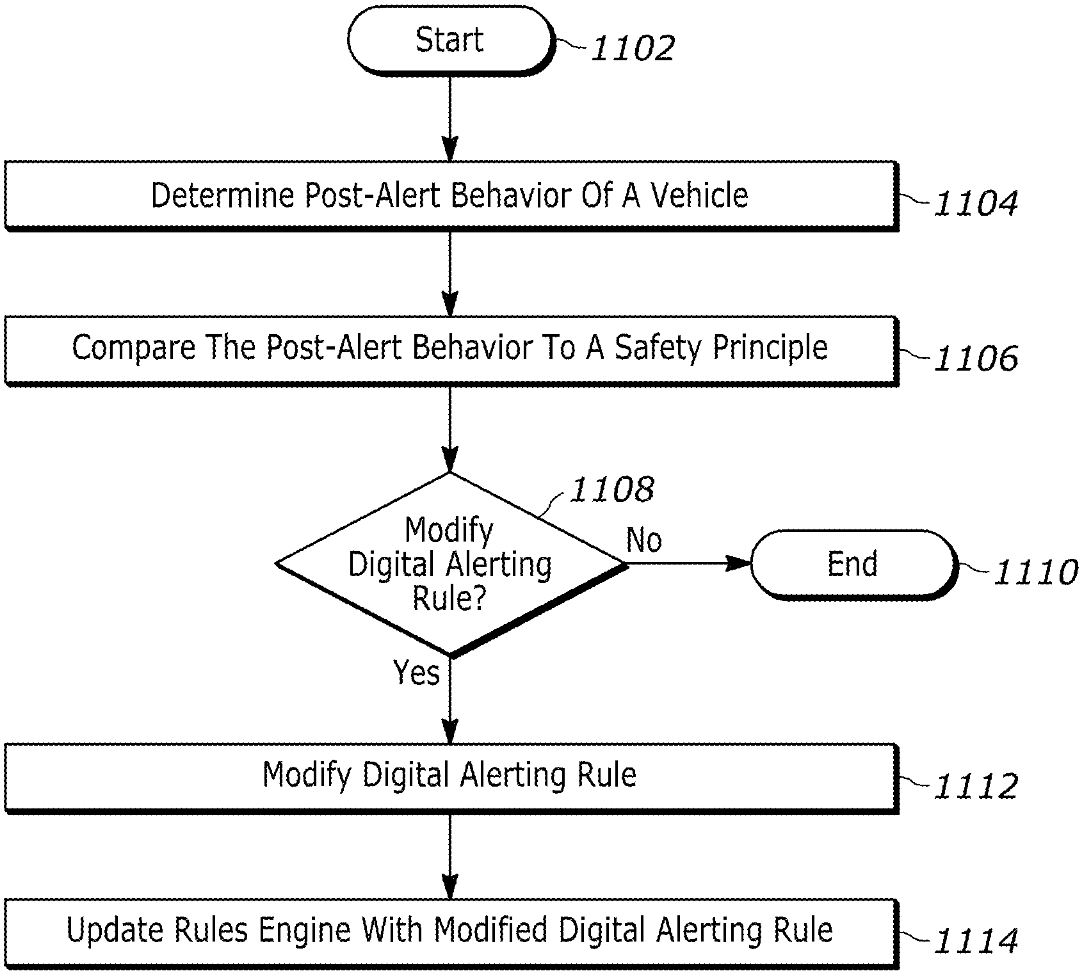
FIG. 11 is an example of a process flow diagram of a technique for intelligently managing digital alerting rules.

FIG. 11 is an example of a process flow diagram of a technique for intelligently managing digital alerting rules. The process starts at 1102, and at block 1104, a post-alert behavior of a vehicle is determined. The post-alert behavior of a vehicle can be determined at a safety cloud of a safety system from telemetry data including alert data collected in an alert database and vehicle telemetry data collected in a vehicle tracking database. In an example, the post-alert behavior is determined from at least a timestamp corresponding to a digital alert and from time-series vehicle telemetry data corresponding to a vehicle that received the digital alert. At block 1106, the post-alert behavior of the vehicle is compared to a safety principle. For example, the determined post-alert behavior of a time to an encounter with a hazard is compared to a safety principle of providing a digital alert 15-20 second before encountering the corresponding hazard. At decision point 1108, it is determined if a digital alerting rule should be modified based on the post-alert behavior. For example, the digital alerting rule is modified if the post-alert behavior does not meet the safety principle. If it is determined that the digital alerting rule should not be modified, then the process ends at block 1110. If, however, it is determined that the digital alerting rule should be modified, then at block 1112, the digital alerting rule is modified. For example, a parameter such as a separation distance of the digital alerting rule is increased or decreased to influence the time to encounter a hazard for subsequent digital alerting events. Once the digital alerting rule is modified, at block 1114, a rules engine is updated with the modified digital alerting rule. For example, the modified digital alerting rule is propagated to a rules engine of a safety cloud.

In an example, the process flow diagram of a technique for intelligently managing digital alerting rules described above with reference to FIG. 11 can be expressed in computer executable instructions as:

if post-alert behavior safety principle,
  then, modify digital alerting rule,
  else, end.

In some examples, the post-alert behavior of a vehicle is determined from data held in an alert database and from data held in a vehicle tracking database as described with reference to FIGS. 6-8. In another example, post-alert behavior may be determined from vehicle telemetry data itself. In an example, the vehicle telemetry data that is provided to the safety cloud from vehicles may also include information about digital alerts that are received at the vehicle. FIG. 12 is an example of vehicle telemetry data 1228 for a vehicle, V1, that is collected at the safety cloud. As shown in FIG. 12, the vehicle telemetry data includes a time series of location data as well as an indication of when a digital alert was received at the vehicle. Given such as set of vehicle telemetry data, pre-alert data 1218A and post-alert data 1218B can be identified from knowledge of the timing of the digital alert and corresponding post-alert behavior can be determined from the post-alert data. For example, a magnitude of deceleration that occurred after receiving the digital alert can be determined from the vehicle telemetry data as a post-alert behavior. In an example, the magnitude of deceleration is an indication of how hard the vehicle braked in response to a digital alert and/or in response to the corresponding hazard. The magnitude of deceleration can be compared to a safety principle that is defined in terms of a deceleration threshold and the digital alerting rule that triggered the digital alert can be evaluated in view of the magnitude of deceleration (post-alert behavior) and the deceleration threshold (safety principle). The corresponding digital alerting rule can be modified based on whether or not the safety principle was met.

As described herein, post-alert behavior of a vehicle is determined by the safety system and used by the safety system to determine whether or not to modify a digital alerting rule. An example of post-alert behavior is the time to encountering a corresponding hazard. Other post-alert behaviors can be determined from telemetry data received from vehicles and used to determine whether or not to modify digital alerting rules. Vehicles may include multiple different sensors and/or components that can provide various different types of data to the safety cloud. Examples of sensors and/or components that may provide useful information to the safety cloud include GPS units, accelerometers, speedometer, steering columns, blinkers, hazard lights, headlights, airbags, impact sensors, radar, lidar, cameras, and in-cabin sensors such as temperature sensors, vitals sensors, and gaze detectors. Examples of vehicle telemetry data that may be provided to the safety cloud from vehicles includes GPS data, speed data, braking data, steering column data, blinker data, hazard light data, airbag deployment data, impact data, and driver awareness data (e.g., gaze direction, alertness, vitals). Post-alert behaviors may be determined from any of these types of vehicle telemetry data, either a single type of data or a combination of different types of data.

Separation distance is described herein as an example of a parameter of a digital alerting rule. The separation distance can be modified to influence post-alert behavior of vehicles towards the goal of meeting a safety principle. Other parameters of a digital alerting rule may be modified to influence post-alert behavior of vehicles towards the goal of meeting a safety principle. Examples of other parameters of digital alerting rules that may be modified to influence post-alert behavior of vehicles include the number of digital alerts provided to a vehicle regarding a hazard, the frequency and/or pattern of digital alerts provided to a vehicle regarding a hazard, some characteristic of the digital alert, e.g., the type of presentation/notification (visual, audible, tactile), size of the presentation/notification, color of the presentation/notification, volume of the presentation/notification, mode of presentation/notification (navigation system, dashboard, heads up display). In one example, a digital alerting rule may be modified to provide a louder notification within the vehicle in response to a safety principle not being met. In another example, a rapid fire burst of notifications may be provided within the vehicle in response to a safety principle not being met. In another example, multiple parameters of a digital alerting rule may be modified in response to a safety principle not being met. Thus, there are many different ways that a digital alerting rule can be modified to influence post-alert behavior of vehicles with the goal of meeting a certain safety principle, or set of safety principles. In an example, a characteristic of a digital alert may be communicated to a vehicle as a value in the alert ID field of a digital alert message.

In an example, a parameter of a digital alerting rule may differ depending on different extrinsic conditions. For example, a separation distance parameter of a digital alerting rule may vary depending on time of day, day of week, month of year, weather conditions, special event conditions, etc. In an example, the separation distance in a digital alerting rule may automatically be increased from a current value during low or no light conditions (e.g., nighttime) or during inclement weather conditions (e.g., rain, ice, or snow). Such variations in parameters may be automatically incorporated into the intelligent and automatic modification of digital alerting rules that is implemented by the safety cloud based on post-alert behavior of vehicles.

In an example, a safety principle can be modified within the rules management module. For example, an alert time buffer could be manually or automatically changed, (e.g., increased or decreased), which may cause the safety system to automatically modify corresponding digital alerting rules based on the modified safety principle. Likewise, a new safety principle can be linked to a digital alerting rule. For example, a safety principle about deceleration could be added to a digital alerting rule, which will automatically cause the corresponding digital alerting rule to adapt based on the new safety principle.

In an example, the determination of whether or not to modify a digital alerting rule may be made by the safety cloud based on pre-alert behavior as well post-alert behavior. For example, knowing how fast a vehicle was traveling before receiving a digital alert may be helpful to the safety cloud in deciding whether or not a digital alert should be modified and/or to determine how a digital alert should be modified. For example, vehicles that have higher pre-alert speeds may need larger modifications to a separation distance parameter of a digital alerting rule to help meet a safety principle.

In an example, post-alert behavior may be determined by the safety system from a single piece of post-alert data (e.g., a single entry in a vehicle tracking database) or from multiple pieces of post-alert data (e.g., from multiple entries in a vehicle tracking database). The amount of post-alert data used/desirable to determine post-alert behavior may differ depending on the post-alert behavior that is being determined. In one example, post-alert vehicle telemetry data up until an encounter with the hazard is all that is used to determine post-alert behavior, and in another example, post-alert vehicle telemetry data that extends (in time) beyond an encounter with the hazard may be used to determine post-alert behavior. In an example, post alert data/behavior can be characterized as pre-encounter data/behavior, or post-encounter data/behavior.

In an example, a timestamp includes date and time information as is known in the field. For example, a timestamp may use the format YYYY-MM-DD hh:mm:ss, where YYYY is the year, MM is the month, DD is the day, hh is the hour (on a 24 hour clock), mm is the minutes, and ss is the seconds.

In an example, the vehicles, including the alerting vehicles and the non-alerting vehicles, are equipped with a GPS receiver to generate the vehicle telemetry data (e.g., including location and motion information) and a wireless communications transceiver (e.g., 3G, 4G, 5G transceivers) to transmit the vehicle telemetry data from the vehicle to a base station. The vehicle telemetry data can be then be sent from the base station to the safety cloud via known networking communications technologies.

In an example, telemetry data is data that is generated at a device (e.g., an on-board vehicle sensor or computer and/or a personal computing device, such as a smartphone) and wirelessly transmitted from the vehicle to a collection device for further analysis and/or processing. In an example, devices include at least one sensor, such as a GPS receiver and/or light activation state sensor, that is configured to generate at least some of the telemetry data and a wireless transceiver to transmit the telemetry data. In one example, telemetry data in the form of location data is generated and transmitted at fixed intervals.

It is understood that the scope of the protection for systems and methods disclosed herein is extended to such a program and in addition to a computer readable means having a message therein, such computer readable storage means contain program code means for implementation of one or more steps of the method, when the program runs on a server or mobile device or any suitable programmable device.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

While the above-described techniques are described in a general context, those skilled in the art will recognize that the above-described techniques may be implemented in software, hardware, firmware, or a combination thereof. The above-described embodiments of the invention may also be implemented, for example, by operating a computer system to execute a sequence of machine-readable instructions. The instructions may reside in various types of computer readable media. In this respect, another aspect of the present invention concerns a programmed product, comprising computer readable media tangibly embodying a program of machine-readable instructions executable by a digital data processor to perform the method in accordance with an embodiment of the present invention.

The computer readable media may comprise, for example, random access memory (not shown) contained within the computer. Alternatively, the instructions may be contained in another non-transitory computer readable media such as a magnetic data storage diskette and directly or indirectly accessed by a computer system. Whether contained in the computer system or elsewhere, the instructions may be stored on a variety of non-transitory machine-readable storage media, such as a direct access storage device (DASD) storage (e.g., a conventional "hard drive" or a Redundant Array of Independent Drives (RAID) array), magnetic tape, electronic read-only memory, an optical storage device (e.g., CD ROM, WORM, DVD, digital optical tape), paper "punch" cards. In an illustrative embodiment of the invention, the machine-readable instructions may comprise lines of compiled C, C++, or similar language code commonly used by those skilled in the programming for this type of application arts.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims as described herein.

What is claimed is:

1. A computer-implemented method for operating a digital alerting system, the method comprising:

determining a post-alert behavior of a vehicle that was provided a digital alert, wherein the post-alert behavior is determined using 1) a time that the digital alert was provided to the vehicle, and 2) vehicle telemetry data that was received at a digital alerting system from the vehicle;

modifying a digital alerting rule based on the post-alert behavior; and updating a rules engine of the digital alerting system with the modified digital alerting rule, wherein the rules engine is configured to implement digital alerting rules;

wherein determining a post-alert behavior includes:

1) identifying, in an alert database of the digital alerting system, a vehicle ID of the vehicle that received the digital alert, wherein the alert database includes alert entries, with each alert entry including an alert ID, a timestamp, and vehicle IDs of alerted vehicles;

2) identifying, in a vehicle tracking database of the digital alerting system, vehicle telemetry data for the vehicle that is later in time than the time that the digital alert was provided to the vehicle, wherein the vehicle tracking database includes vehicle data entries, with each vehicle data entry including a vehicle ID, a timestamp, and location information, wherein the vehicle telemetry data for the vehicle that is later in time than the time that the digital alert was provided to the vehicle is identified in the vehicle tracking database using the vehicle ID, timestamps of the vehicle data entries, and a timestamp of the digital alert; and 3) using the vehicle telemetry data for the vehicle that has a timestamp later in time than the timestamp of the digital alert to determine the post-alert behavior.

2. The computer-implemented method of claim 1, wherein the post-alert behavior of the vehicle is determined using vehicle telemetry data that is later in time than the time that the digital alert was provided to the vehicle.

3. The computer-implemented method of claim 2, wherein the post-alert behavior includes a time interval between the time that the digital alert was provided to the vehicle and a time that the vehicle encountered a hazard that corresponds to the digital alert.

4. The computer-implemented method of claim 1, wherein the post-alert behavior includes deceleration of the vehicle.

5. The computer-implemented method of claim 1, wherein the post-alert behavior includes a change in direction of the vehicle.

6. The computer-implemented method of claim 1, wherein determining a post-alert behavior includes:

1) identifying a vehicle ID of the vehicle that received the digital alert;

2) identifying, using the vehicle ID, vehicle telemetry data for the vehicle that is later in time than the time that the digital alert was provided to the vehicle; and 3) using the vehicle telemetry data for the vehicle that is later in time than the time that the digital alert as provided to the vehicle to determine the post-alert behavior.

7. The method of claim 1, wherein modifying the digital alerting rule based on the post-alert behavior includes comparing the post-alert behavior to a safety principle.

8. The computer-implemented method of claim 7, wherein the safety principle is an alert time buffer, which is a target time interval between the time that the digital alert was provided to the vehicle and a time that the vehicle encountered a hazard corresponding to the digital alert.

9. The computer-implemented method of claim 7, wherein the safety principle is a deceleration threshold.

10. The computer-implemented method of claim 7, wherein the safety principle is a change in direction threshold.

11. The computer-implemented method of claim 1, wherein:

the post-alert behavior of the vehicle is determined using vehicle telemetry data that is later in time than the time that the digital alert was provided to the vehicle; and modifying the digital alerting rule based on the post-alert behavior includes comparing the post-alert behavior to a safety principle.

12. The computer-implemented method of claim 11, wherein the safety principle is a time interval between the time that the digital alert was provided to the vehicle and a time that the vehicle encountered a hazard that corresponds to the digital alert, and wherein modifying the digital alerting rule includes changing a dimension of an alerting zone when the time interval is not met.

13. The computer-implemented method of claim 11, wherein the post-alert behavior includes deceleration of the vehicle and the safety principle is a deceleration threshold.

14. The computer-implemented method of claim 13, wherein modifying the digital alerting rule includes increasing a dimension of an alerting zone when the deceleration exceeds the deceleration threshold.

15. The computer-implemented method of claim 11, wherein the post-alert behavior includes a change in direction of the vehicle and the safety principle is a change in direction threshold.

16. The computer-implemented method of claim 15, wherein modifying the digital alerting rule includes increasing a dimension of an alerting zone when the change in direction of the vehicle exceeds the change in direction threshold.

17. The computer-implemented method of claim 1, wherein modifying the digital alerting rule includes changing a frequency of digital alerting to a vehicle.

18. The computer-implemented method of claim 1, wherein modifying the digital alerting rule includes changing a characteristic of how a digital alert is presented within a vehicle.

19. The computer-implemented method of claim 1, further comprising generating a new digital alert in response to application of the modified digital alerting rule.

20. The computer-implemented method of claim 1, wherein the digital alerting rule is modified in view of the post-alert behavior and in view of pre-alert behavior.

21. The computer-implemented method of claim 20, further comprising determining the pre-alert behavior using the time that the digital alert was provided to the vehicle, and vehicle telemetry data that was received at a digital alerting system from the vehicle.

22. The computer-implemented method of claim 1, further comprising:

1) receiving telemetry data that includes a location of an alerting vehicle and an alert status of the alerting vehicle; and 2) receiving telemetry data that includes locations and vehicle IDs corresponding to a plurality of non-alerting vehicles; and 3) generating digital alerts for the non-alerting vehicles that are in an alerting zone of the alerting vehicle using the telemetry data.

23. A non-transitory computer readable medium comprising instructions to be executed in a computer system, wherein the instructions when executed in the computer system perform a method comprising:

determining a post-alert behavior of a vehicle that was provided a digital alert, wherein the post-alert behavior is determined using 1) a time that the digital alert was provided to the vehicle, and 2) vehicle telemetry data that was received at a digital alerting system from the vehicle;

modifying a digital alerting rule based on the post-alert behavior; and updating a rules engine of the digital alerting system with the modified digital alerting rule, wherein the rules engine is configured to implement digital alerting rules;

wherein determining a post-alert behavior includes:

1) identifying, in an alert database of the digital alerting system, a vehicle ID of the vehicle that received the digital alert, wherein the alert database includes alert entries, with each alert entry including an alert ID, a timestamp, and vehicle IDs of alerted vehicles;

2) identifying, in a vehicle tracking database of the digital alerting system, vehicle telemetry data for the vehicle that is later in time than the time that the digital alert was provided to the vehicle, wherein the vehicle tracking database includes vehicle data entries, with each vehicle data entry including a vehicle ID, a timestamp, and location information, wherein the vehicle telemetry data for the vehicle that is later in time than the time that the digital alert was provided to the vehicle is identified in the vehicle tracking database using the vehicle ID, timestamps of the vehicle data entries, and a timestamp of the digital alert; and 3) using the vehicle telemetry data for the vehicle that has a timestamp later in time than the timestamp of the digital alert to determine the post-alert behavior.

24. A computer-implemented method for operating a digital alerting system, the method comprising:

determining, at a safety cloud, a post-alert behavior of a vehicle that was provided a digital alert, wherein the post-alert behavior is determined using 1) a time that the digital alert was provided to the vehicle, and 2) vehicle telemetry data that was received at a digital alerting system from the vehicle;

modifying, at the safety cloud, a digital alerting rule based on the post-alert behavior; and updating, at the safety cloud, a rules engine of the digital alerting system with the modified digital alerting rule, wherein the rules engine is configured to implement digital alerting rules, wherein determining a post-alert behavior includes:

1) identifying, in an alert database of the digital alerting system, a vehicle ID of the vehicle that received the digital alert, wherein the alert database includes alert entries, with each alert entry including an alert ID, a timestamp, and vehicle IDs of alerted vehicles;

2) identifying, in a vehicle tracking database of the digital alerting system, vehicle telemetry data for the vehicle that is later in time than the time that the digital alert was provided to the vehicle, wherein the vehicle tracking database includes vehicle data entries, with each vehicle data entry including a vehicle ID, a timestamp, and location information, wherein the vehicle telemetry data for the vehicle that is later in time than the time that the digital alert was provided to the vehicle is identified in the vehicle tracking database using the vehicle ID, timestamps of the vehicle data entries, and a timestamp of the digital alert; and 3) using the vehicle telemetry data for the vehicle that has a timestamp later in time than the timestamp of the digital alert to determine the post-alert behavior.

* * * * *